United States Patent
Iliofotou et al.

(10) Patent No.: US 11,777,974 B2
(45) Date of Patent: *Oct. 3, 2023

(54) SYSTEMS DATA AVAILABILITY VALIDATION

(71) Applicant: Splunk Inc., San Francisco, CA (US)

(72) Inventors: Marios Iliofotou, San Jose, CA (US); Bo Lei, San Jose, CA (US); Essam Zaky, San Francisco, CA (US); Karthik Kannan, San Francisco, CA (US); George Apostolopoulos, San Francisco, CA (US); Jeswanth Manikonda, San Francisco, CA (US); Sitaram Venkatraman, San Francisco, CA (US)

(73) Assignee: Splunk Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/680,240

(22) Filed: Feb. 24, 2022

(65) Prior Publication Data

US 2022/0247770 A1    Aug. 4, 2022

Related U.S. Application Data

(63) Continuation of application No. 16/861,031, filed on Apr. 28, 2020, now Pat. No. 11,297,087, which is a
(Continued)

(51) Int. Cl.
*H04L 29/06* (2006.01)
*H04L 9/40* (2022.01)

(52) U.S. Cl.
CPC .......... *H04L 63/1425* (2013.01); *H04L 63/08* (2013.01); *H04L 63/1408* (2013.01); *H04L 63/1433* (2013.01); *H04L 2463/121* (2013.01)

(58) Field of Classification Search
None
See application file for complete search history.

(56) References Cited

U.S. PATENT DOCUMENTS

2009/0319771 A1* 12/2009 Nagaraja ............... G06F 21/606
                                                    713/151
2015/0161719 A1   6/2015 Abhyanker
(Continued)

OTHER PUBLICATIONS

Splunk Inc. "Validation of Systems Data", U.S. Appl. No. 16/861,031, including its prosecution history.
(Continued)

*Primary Examiner* — Andrew J Steinle
(74) *Attorney, Agent, or Firm* — Ferguson Braswell Fraser Kubasta PC

(57) ABSTRACT

A network connection between a server group of a data intake and query system and each of one or more source network nodes is established. Source data at the server group is received from at least one of the one or more source network nodes via the respective network connections and transformed, by the indexer server, to timestamped data entries of machine data. A model management server detects data constraints for a security model that include a data element used by the security model and an availability requirement set. Using the timestamped data entries, the data constraints are validated, and the validation used to determine a data availability assessment of the security model.

20 Claims, 22 Drawing Sheets

Related U.S. Application Data continuation of application No. 15/885,485, filed on Jan. 31, 2018, now Pat. No. 10,693,898.

(56) References Cited

U.S. PATENT DOCUMENTS

2018/0336258 A1\* 11/2018 Lee .................. G06F 11/36
2019/0205180 A1\* 7/2019 Macha ............... G06F 11/203

OTHER PUBLICATIONS

Splunk Inc. "Systems Data Validation", U.S. Appl. No. 15/885,485 including its prosecution history.

\* cited by examiner

FIG. 6A

| Data Summary | | | × |
|---|---|---|---|
| Hosts (5) | Sources (8) | Sourcetypes (3) | |
| ( filter ) | | | |

| Host ◊ | | Count ◊ | Last Update ◊ |
|---|---|---|---|
| mailsv | ᴵᴵ ˅ | 9,829 | 4/29/14 1:32:47.000 PM |
| vendor_sales | ᴵᴵ ˅ | 30,244 | 4/29/14 1:32:46.000 PM |
| www1 | ᴵᴵ ˅ | 24,221 | 4/29/14 1:32:44.000 PM |
| www2 | ᴵᴵ ˅ | 22,595 | 4/29/14 1:32:47.000 PM |
| www3 | ᴵᴵ ˅ | 22,975 | 4/29/14 1:32:45.000 PM |

SYSTEMS DATA AVAILABILITY VALIDATION

CROSS REFERENCE TO RELATED APPLICATIONS

This application is a continuation of and claims the benefit of priority under 35 U.S.C. § 120 to U.S. patent application Ser. No. 16/861,031, filed Apr. 28, 2020, which is a continuation of and claims the benefit of priority under 35 U.S.C. § 120 to U.S. patent application Ser. No. 15/885,485, filed Jan. 31, 2018, each of which is hereby incorporated by reference herein in its entirety.

BACKGROUND

Behavior analytics is the process of analyzing large volumes of data to identify the behavior of an entity that directly or indirectly creates the data. Behavior analytics applies machine learning tools to create a set of one or more behavior models. The behavior models describe sets of data that correspond to an anomaly of an expected pattern of data. Thus, the behavior model may be used to trigger an alert when an anomaly is present.

Behavior analytics may be used when managing network security. As data is received from various network devices, machine learning is applied to identify patterns in the data. Based on the patterns, the system may learn expected behavior and anomalous behavior. As new network data is received, the new network data is compared to the behavior model to determine whether an anomaly exists. When an anomaly is detected, further analysis is performed to determine whether the anomaly is a threat to the network. Accordingly, by early detection of threats to the network, the damage caused by the security threat may be mitigated.

BRIEF DESCRIPTION OF DRAWINGS

In the drawings:

FIG. 6A illustrates a search screen in accordance with the disclosed embodiments;

FIG. 6B illustrates a data summary dialog that enables a user to select various data sources in accordance with the disclosed embodiments;

FIG. 8B illustrates an incident review dashboard in accordance with the disclosed embodiments;

DETAILED DESCRIPTION

Figure 1:
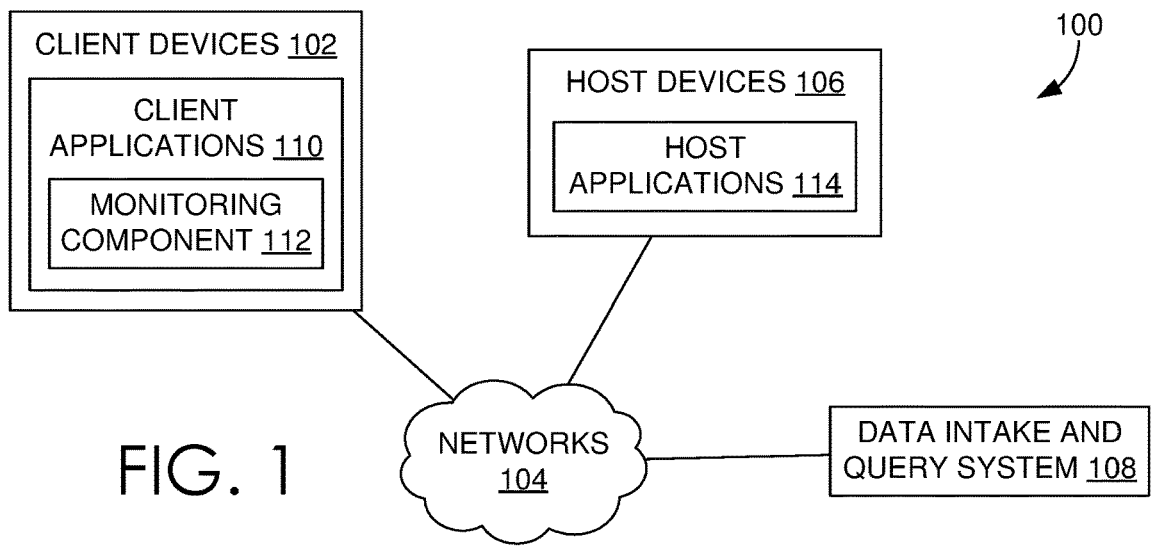
FIG. 1 illustrates a networked computer environment in which an embodiment may be implemented.

Specific embodiments of the invention will now be described in detail with reference to the accompanying figures. Like elements in the various figures are denoted by like reference numerals for consistency.

In the following detailed description of embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, although the description includes a discussion of various embodiments, the various disclosed embodiments may be combined in virtually any manner. All combinations are contemplated herein.

In general, embodiments are directed to data availability validation. In particular, behavior models created based on behavior analytics monitor large volumes of data to determine whether the data corresponds to an expected pattern of behavior. When an analyzer, using a behavior model, detects the pattern, action may be taken. However, the absence of the pattern being detected does not necessarily mean the absence of the pattern existing. In particular, the data relied upon by the behavior model may be unavailable. In such a scenario, the behavior model is inoperable.

In security applications, one or more embodiments provide a technique for monitoring a large network having thousands of possible vulnerabilities. When some portions of the network are not properly reporting data, such as having missing data or incorrect data values, security models are incapable of identifying the possible vulnerabilities of the portions of the network. Additionally, because of the complex configuration of the network, the size of the network, and reconfigurations that may occur, security models often do not maintain the information about the configuration of the network. Thus, security models may be incapable of detecting when missing or incorrect data exists.

Additionally, to avoid excess resource utilization and slowdown of the network, security models often do not report and/or detect when the network is deemed secure. Rather, security models may only report and/or detect when an anomaly or threat is detected.

Accordingly, because security models may only report anomalies and threats and may not have information about the configuration of the network, the lack of reporting an anomaly or threat does not mean that such anomaly or threat does not exist. Rather, data may be unavailable. One or more embodiments detect when data is unavailable. Further, one or more embodiments identify, from the complex network, the particular data source having the missing or incorrect data, the security models, and the types of output of the security models that rely on the missing or incorrect data. By being able to perform the detection and identification, potential vulnerabilities of the network may be corrected. Thus, one or more embodiments provide a technique for securing a complex network.

By way of an example, consider the scenario in which a security model may use the number of bytes out from the various firewalls application instances executing on distributed network. The behavior model may combine the number of bytes out with other information to determine whether an anomaly exists. If an anomaly is determined to exist, the anomaly may be analyzed to detect a threat to the distributed network. However, consider the scenario that a firewall application instance on a network device of the distributed network does not transmit bytes out because of configuration settings, inability to transmit, being disabled, or other factor. In the example, an excess number of byes out from the firewall application instance may exist indicating a threat, but the excess number is not detected. Further, because of the size of the distributed network and the number of firewall application instances executing, determining that the firewall application is not transmitting bytes out is a challenge. Moreover, with the various types of data on which a single behavior model may depend as well as the number of behavior models, the detection may be challenging.

One or more embodiments perform data availability validation for behavior models. In particular, one or more embodiments determine, for each behavior model, data constraints for the behavior model. From the data models and the data constraints, data dependencies are determined. The data dependencies are validated using event data. The validation determines, for each data constraint, whether the data constraint is satisfied to obtain a validation result. The validation result is used to generate a data availability dashboard that may be displayed in a graphical user interface.

Embodiments are described herein according to the following outline:
1.0. General Overview
2.0. Operating Environment
    2.1. Host Devices
    2.2. Client Devices
    2.3. Client Device Applications
    2.4. Data Server System
    2.5. Data Ingestion
        2.5.1. Input
        2.5.2. Parsing
        2.5.3. Indexing
    2.6. Query Processing
    2.7. Field Extraction
    2.8. Example Search Screen
    2.9. Data Modelling
    2.10. Acceleration Techniques
        2.10.1. Aggregation Technique
        2.10.2. Keyword Index
        2.10.3. High Performance Analytics Store
        2.10.4. Accelerating Report Generation
    2.11. Security Features
    2.12. Data Center Monitoring
    2.13. Cloud-Based System Overview
    2.14. Searching Externally Archived Data
        2.14.1. ERP Process Features
3.0 Data Availability Validation
4.0 Hardware
1.0. General Overview Modern data centers and other computing environments can comprise anywhere from a few host computer systems to thousands of systems configured to process data, service requests from remote clients, and perform numerous other computational tasks. During operation, various components within these computing environments often generate significant volumes of machine-generated data. For example, machine data is generated by various components in the information technology (IT) environments, such as servers, sensors, routers, mobile devices, Internet of Things (IoT) devices, etc. Machine-generated data can include system logs, network packet data, sensor data, application program data, error logs, stack traces, system performance data, etc. In general, machine-generated data can also include performance data, diagnostic information, and many other types of data that can be analyzed to diagnose performance problems, monitor user interactions, and to derive other insights.

A number of tools are available to analyze machine data, that is, machine-generated data. To reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, Calif. The SPLUNK® ENTERPRISE system is the leading platform for providing real-time operational intelligence that enables organizations to collect, index, and search machine-generated data from various websites, applications, servers, networks, and mobile devices that power their businesses. The SPLUNK® ENTERPRISE system is particularly useful for analyzing data which is commonly found in system log files, network data, and other data sources. Although many of the techniques described herein are explained with reference to a data intake and query system similar to the SPLUNK® ENTERPRISE system, these techniques are also applicable to other types of data systems.

In the SPLUNK® ENTERPRISE system, machine-generated data are collected and stored as "events". An event comprises a portion of the machine-generated data and is associated with a specific point in time. For example, events may be derived from "time series data," where the time series data comprises a sequence of data points (e.g., performance measurements from a computer system, etc.) that are associated with successive points in time. In general, each event can be associated with a timestamp that is derived from the raw data in the event, determined through interpolation between temporally proximate events having known timestamps, or determined based on other configurable rules for associating timestamps with events, etc.

In some instances, machine data can have a predefined format, where data items with specific data formats are stored at predefined locations in the data. For example, the machine data may include data stored as fields in a database table. In other instances, machine data may not have a predefined format, that is, the data is not at fixed, predefined locations, but the data does have repeatable patterns and is not random. This means that some machine data can comprise various data items of different data types and that may be stored at different locations within the data. For example, when the data source is an operating system log, an event can include one or more lines from the operating system log containing raw data that includes different types of performance and diagnostic information associated with a specific point in time.

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The data generated by such data sources can include, for example and without limitation, server log files, activity log files, configuration files, messages, network packet data, performance measurements, sensor measurements, etc.

The SPLUNK® ENTERPRISE system uses flexible schema to specify how to extract information from the event data. A flexible schema may be developed and redefined as needed. Note that a flexible schema may be applied to event data "on the fly," when it is needed (e.g., at search time, index time, ingestion time, etc.). When the schema is not applied to event data until search time it may be referred to as a "late-binding schema."

During operation, the SPLUNK® ENTERPRISE system starts with raw input data (e.g., one or more system logs, streams of network packet data, sensor data, application program data, error logs, stack traces, system performance data, etc.). The system divides this raw data into blocks (e.g., buckets of data, each associated with a specific time frame, etc.), and parses the raw data to produce timestamped events. The system stores the timestamped events in a data store. The system enables users to run queries against the stored data to, for example, retrieve events that meet criteria specified in a query, such as containing certain keywords or having specific values in defined fields. As used herein throughout, data that is part of an event is referred to as "event data". In this context, the term "field" refers to a location in the event data containing one or more values for a specific data item. As will be described in more detail herein, the fields are defined by extraction rules (e.g., regular expressions) that derive one or more values from the portion of raw machine data in each event that has a particular field specified by an extraction rule. The set of values so produced are semantically-related (such as IP address), even though the raw machine data in each event may be in different formats (e.g., semantically-related values may be in different positions in the events derived from different sources).

As noted above, the SPLUNK® ENTERPRISE system utilizes a late-binding schema to event data while performing queries on events. One aspect of a late-binding schema is applying "extraction rules" to event data to extract values for specific fields during search time. More specifically, the extraction rules for a field can include one or more instructions that specify how to extract a value for the field from the event data. An extraction rule can generally include any type of instruction for extracting values from data in events. In some cases, an extraction rule comprises a regular expression where a sequence of characters forms a search pattern, in which case the rule is referred to as a "regex rule." The system applies the regex rule to the event data to extract values for associated fields in the event data by searching the event data for the sequence of characters defined in the regex rule.

In the SPLUNK® ENTERPRISE system, a field extractor may be configured to automatically generate extraction rules for certain field values in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the SPLUNK® ENTERPRISE system maintains the underlying raw data and uses late-binding schema for searching the raw data, it enables a user to continue investigating and learn valuable insights about the raw data.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by disparate data sources, the system facilitates use of a "common information model" (CIM) across the disparate data sources (further discussed with respect to FIG. 5).

2.0. Operating Environment

FIG. 1 illustrates a networked computer system 100 in which an embodiment may be implemented. Those skilled in the art would understand that FIG. 1 represents one example of a networked computer system and other embodiments may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In an embodiment, one or more client devices 102 are coupled to one or more host devices 106 and a data intake and query system 108 via one or more networks 104. Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

2.1. Host Devices

In the illustrated embodiment, a system 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine-generated data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

2.2. Client Devices

Client devices 102 of FIG. 1 represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

2.3. Client Device Applications

In an embodiment, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In an embodiment, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on component. Monitoring component 112 may also be a stand-alone process.

In one embodiment, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some cases, an SDK or other code for implementing the monitoring functionality may be offered by a provider of a data intake and query system, such as a system 108. In such cases, the provider of the system 108 can implement the custom code so that performance data generated by the monitoring functionality is sent to the system 108 to facilitate analysis of the performance data by a developer of the client application or other users.

In an embodiment, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In an embodiment, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In an embodiment, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference in its entirety for all purposes.

In an embodiment, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In an embodiment, the monitoring component 112 may also monitor and collect other device profile information including, for example, a type of client device, a manufacturer and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

2.4. Data Server System

Figure 2:
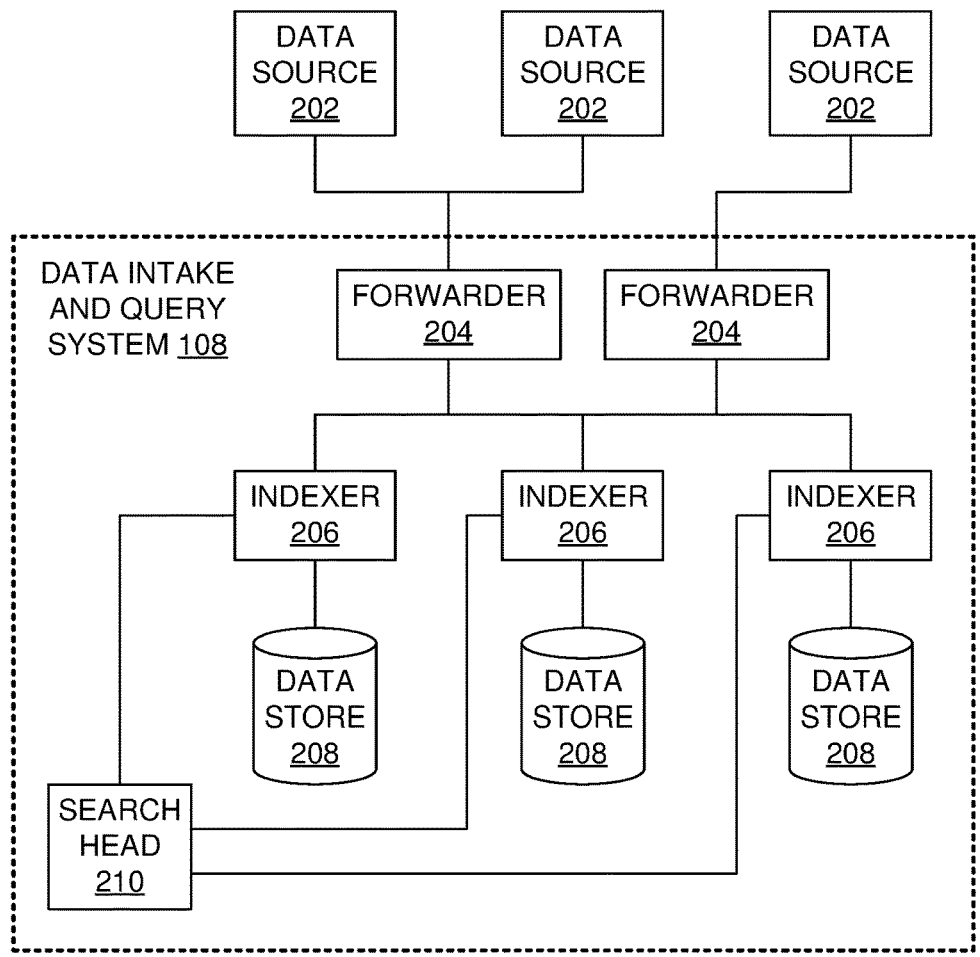
FIG. 2 illustrates a block diagram of an example data intake and query system in which an embodiment may be implemented.

FIG. 2 depicts a block diagram of an exemplary data intake and query system 108, similar to the SPLUNK® ENTERPRISE system. System 108 includes one or more forwarders 204 that receive data from a variety of input data sources 202, and one or more indexers 206 that process and store the data in one or more data stores 208. These forwarders and indexers can comprise separate computer systems, or may alternatively comprise separate processes executing on one or more computer systems.

Each data source 202 broadly represents a distinct source of data that can be consumed by a system 108. Examples of a data source 202 include, without limitation, data files, directories of files, data sent over a network, event logs, registries, etc.

During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, parsing data, indexing data, routing data based on criteria relating to the data being routed, and/or performing other data transformations.

In an embodiment, a forwarder 204 may comprise a service accessible to client devices 102 and host devices 106 via a network 104. For example, one type of forwarder 204 may be capable of consuming vast amounts of real-time data from a potentially large number of client devices 102 and/or host devices 106. The forwarder 204 may, for example, comprise a computing device which implements multiple data pipelines or "queues" to handle forwarding of network data to indexers 206. A forwarder 204 may also perform many of the functions that are performed by an indexer. For example, a forwarder 204 may perform keyword extractions on raw data or parse raw data to create events. A forwarder 204 may generate time stamps for events. Additionally or alternatively, a forwarder 204 may perform routing of events to indexers. Data store 208 may contain events derived from machine data from a variety of sources all pertaining to the same component in an IT environment, and this data may be produced by the machine in question or by other components in the IT environment.

2.5. Data Ingestion

Figure 3:
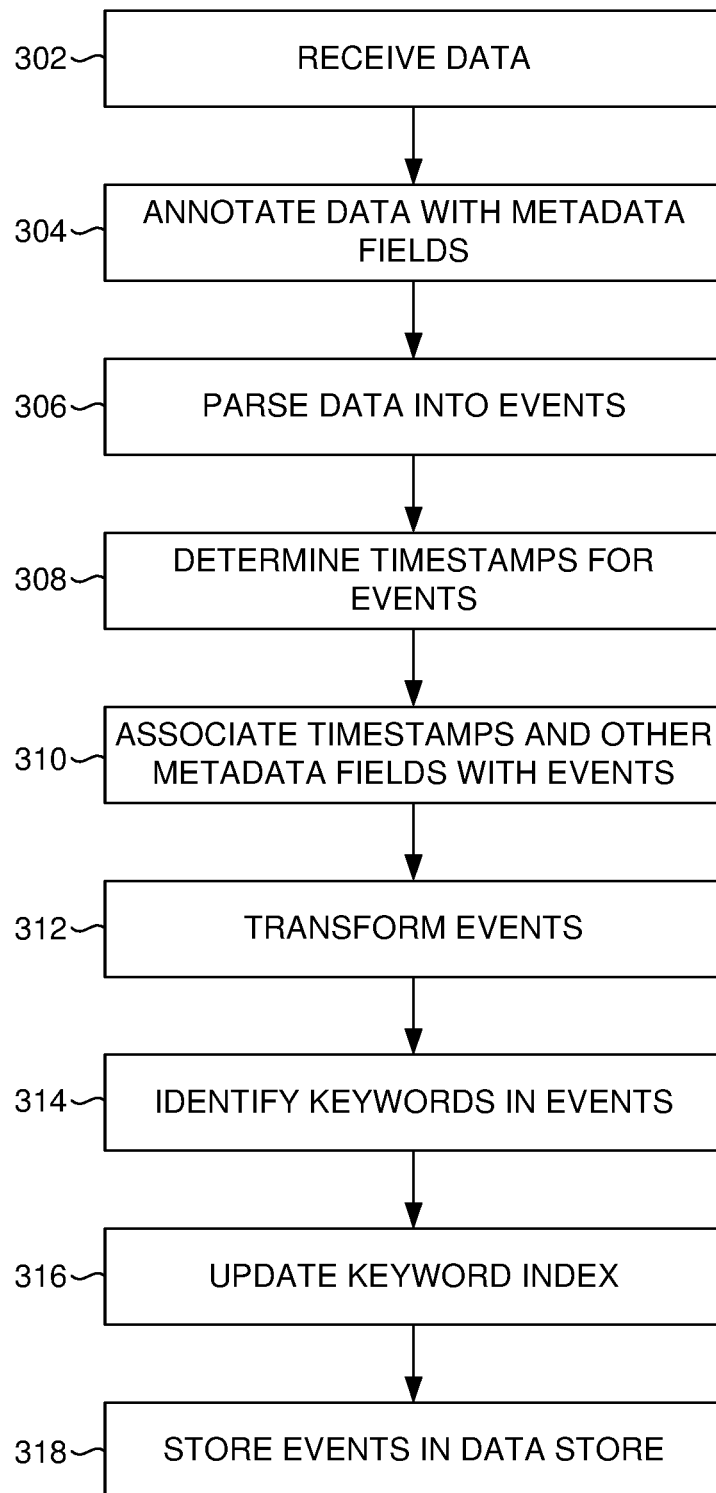
FIG. 3 is a flow diagram that illustrates how indexers process, index, and store data received from forwarders in accordance with the disclosed embodiments.

FIG. 3 depicts a flow chart illustrating an example data flow performed by Data Intake and Query system 108, in accordance with the disclosed embodiments. The data flow illustrated in FIG. 3 is provided for illustrative purposes only; those skilled in the art would understand that one or more of the steps of the processes illustrated in FIG. 3 may be removed or the ordering of the steps may be changed. Furthermore, for the purposes of illustrating a clear example, one or more particular system components are described in the context of performing various operations during each of the data flow stages. For example, a forwarder is described as receiving and processing data during an input phase; an indexer is described as parsing and indexing data during parsing and indexing phases; and a search head is described as performing a search query during a search phase. However, other system arrangements and distributions of the processing steps across system components may be used.

2.5.1. Input

At block 302, a forwarder receives data from a data source, such as a data source 202 shown in FIG. 2. A forwarder initially may receive the data as a raw data stream generated by the data source. For example, a forwarder may receive a data stream from a log file generated by an application server, from a stream of network data from a network device, or from any other source of data. In one embodiment, a forwarder receives the raw data and may segment the data stream into "blocks", or "buckets," possibly of a uniform data size, to facilitate subsequent processing steps.

At block 304, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In an embodiment, a forwarder forwards the annotated data blocks to another system component (typically an indexer) for further processing.

The SPLUNK® ENTERPRISE system allows forwarding of data from one SPLUNK® ENTERPRISE instance to another, or even to a third-party system. SPLUNK® ENTERPRISE system can employ different types of forwarders in a configuration.

In an embodiment, a forwarder may contain the essential components needed to forward data. It can gather data from a variety of inputs and forward the data to a SPLUNK® ENTERPRISE server for indexing and searching. It also can tag metadata (e.g., source, source type, host, etc.).

Additionally or optionally, in an embodiment, a forwarder has the capabilities of the aforementioned forwarder as well as additional capabilities. The forwarder can parse data before forwarding the data (e.g., associate a time stamp with a portion of data and create an event, etc.) and can route data based on criteria such as source or type of event. It can also index data locally while forwarding the data to another indexer.

2.5.2. Parsing

At block 306, an indexer receives data blocks from a forwarder and parses the data to organize the data into events. In an embodiment, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries of events within the data. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, it can apply an inferred source type definition to the data to create the events.

At block 308, the indexer determines a timestamp for each event Similar to the process for creating events, an indexer may again refer to a source type definition associated with the data to locate one or more properties that indicate instructions for determining a timestamp for each event. The properties may, for example, instruct an indexer to extract a time value from a portion of data in the event, to interpolate time values based on timestamps associated with temporally proximate events, to create a timestamp based on a time the event data was received or generated, to use the timestamp of a previous event, or use any other rules for determining timestamps.

At block 310, the indexer associates with each event one or more metadata fields including a field containing the timestamp (in some embodiments, a timestamp may be included in the metadata fields) determined for the event. These metadata fields may include a number of "default fields" that are associated with all events, and may also include one more custom fields as defined by a user. Similar to the metadata fields associated with the data blocks at block 304, the default metadata fields associated with each event may include a host, source, and source type field including or in addition to a field storing the time stamp.

At block 312, an indexer may optionally apply one or more transformations to data included in the events created at block 306. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to event data may, for example, be specified in one or more configuration files and referenced by one or more source type definitions.

2.5.3. Indexing

At blocks 314 and 316, an indexer can optionally generate a keyword index to facilitate fast keyword searching for event data. To build a keyword index, at block 314, the indexer identifies a set of keywords in each event. At block 316, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for name-value pairs found in events, where a name-value pair can include a pair of keywords connected by a symbol, such as an equals sign or colon. This way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2".

At block 318, the indexer stores the events with an associated timestamp in a data store 208. Timestamps enable a user to search for events based on a time range. In one embodiment, the stored events are organized into "buckets," where each bucket stores events associated with a specific time range based on the timestamps associated with each event. This may not only improve time-based searching, but also allows for events with recent timestamps, which may have a higher likelihood of being accessed, to be stored in a faster memory to facilitate faster retrieval. For example, buckets containing the most recent events can be stored in flash memory rather than on a hard disk.

Each indexer 206 may be responsible for storing and searching a subset of the events contained in a corresponding data store 208. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize data retrieval process by searching buckets corresponding to time ranges that are relevant to a query.

Moreover, events and buckets can also be replicated across different indexers and data stores to facilitate high availability and disaster recovery as described in U.S. patent application Ser. No. 14/266,812, entitled "SITE-BASED SEARCH AFFINITY", filed on 30 Apr. 2014, and in U.S. patent application Ser. No. 14/266,817, entitled "MULTI-SITE CLUSTERING", also filed on 30 Apr. 2014, each of which is hereby incorporated by reference in its entirety for all purposes.

2.6. Query Processing

Figure 4:
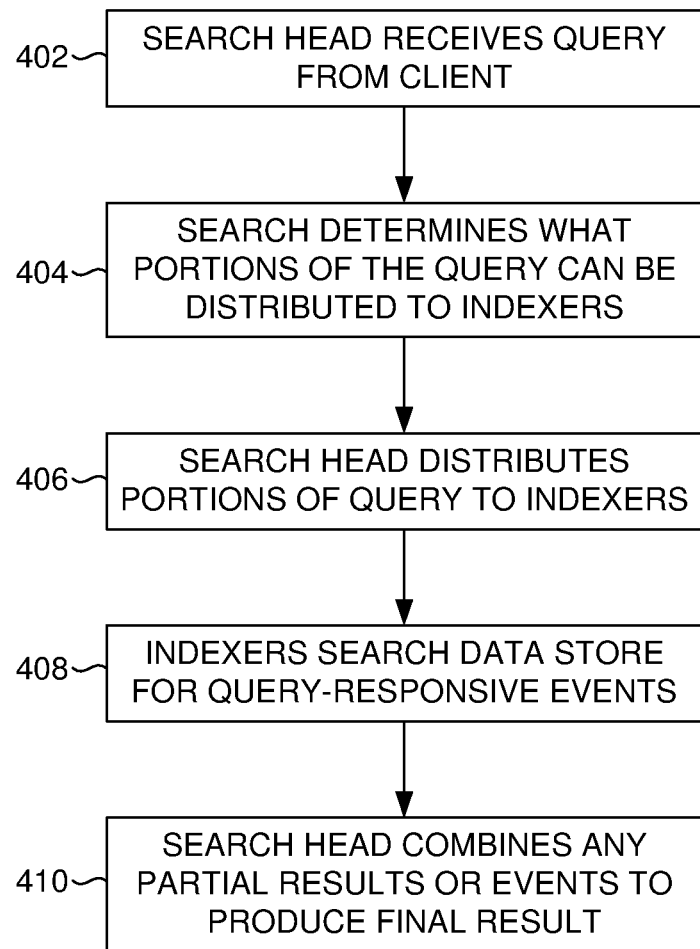
FIG. 4 is a flow diagram that illustrates how a search head and indexers perform a search query in accordance with the disclosed embodiments.

FIG. 4 is a flow diagram that illustrates an example process that a search head and one or more indexers may perform during a search query. At block 402, a search head receives a search query from a client. At block 404, the search head analyzes the search query to determine what portion(s) of the query can be delegated to indexers and what portions of the query can be executed locally by the search head. At block 406, the search head distributes the determined portions of the query to the appropriate indexers. In an embodiment, a search head cluster may take the place of an independent search head where each search head in the search head cluster coordinates with peer search heads in the search head cluster to schedule jobs, replicate search results, update configurations, fulfill search requests, etc. In an embodiment, the search head (or each search head) communicates with a master node (also known as a cluster master, not shown in Fig.) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At block 408, the indexers to which the query was distributed, search data stores associated with them for events that are responsive to the query. To determine which events are responsive to the query, the indexer searches for events that match the criteria specified in the query. These criteria can include matching keywords or specific values for certain fields. The searching operations at block 408 may use the late-binding schema to extract values for specified fields from events at the time the query is processed. In an embodiment, one or more rules for extracting field values may be specified as part of a source type definition. The indexers may then either send the relevant events back to the search head, or use the events to determine a partial result, and send the partial result back to the search head.

At block 410, the search head combines the partial results and/or events received from the indexers to produce a final result for the query. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries that are performed on a periodic basis.

2.7. Field Extraction

The search head 210 allows users to search and visualize event data extracted from raw machine data received from homogenous data sources. It also allows users to search and visualize event data extracted from raw machine data received from heterogeneous data sources. The search head 210 includes various mechanisms, which may additionally reside in an indexer 206, for processing a query. Splunk Processing Language (SPL), used in conjunction with the SPLUNK® ENTERPRISE system, can be utilized to make a query. SPL is a pipelined search language in which a set of inputs is operated on by a first command in a command line, and then a subsequent command following the pipe symbol "|" operates on the results produced by the first command, and so on for additional commands. Other query languages, such as the Structured Query Language ("SQL"), can be used to create a query.

In response to receiving the search query, search head 210 uses extraction rules to extract values for the fields associated with a field or fields in the event data being searched. The search head 210 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

The search head 210 can apply the extraction rules to event data that it receives from indexers 206. Indexers 206 may apply the extraction rules to events in an associated data store 208. Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

Figure 5:
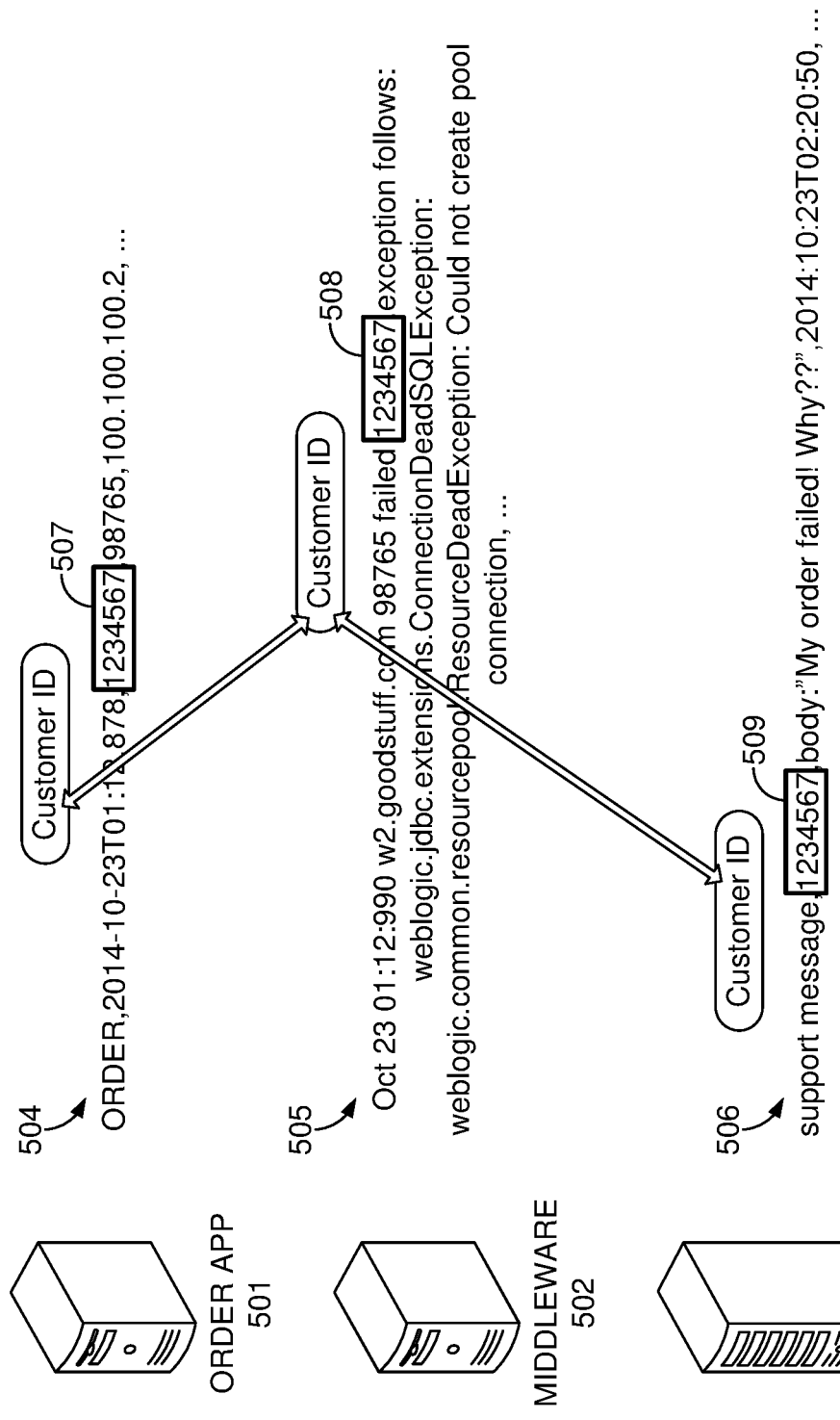
FIG. 5 illustrates a scenario where a common customer ID is found among log data received from three disparate sources in accordance with the disclosed embodiments.

FIG. 5 illustrates an example of raw machine data received from disparate data sources. In this example, a user submits an order for merchandise using a vendor's shopping application program 501 running on the user's system. In this example, the order was not delivered to the vendor's server due to a resource exception at the destination server that is detected by the middleware code 502. The user then sends a message to the customer support 503 to complain about the order failing to complete. The three systems 501, 502, and 503 are disparate systems that do not have a common logging format. The order application 501 sends log data 504 to the SPLUNK® ENTERPRISE system in one format, the middleware code 502 sends error log data 505 in a second format, and the support server 503 sends log data 506 in a third format.

Using the log data received at one or more indexers 206 from the three systems the vendor can uniquely obtain an insight into user activity, user experience, and system behavior. The search head 210 allows the vendor's administrator to search the log data from the three systems that one or more indexers 206 are responsible for searching, thereby obtaining correlated information, such as the order number and corresponding customer ID number of the person placing the order. The system also allows the administrator to see a visualization of related events via a user interface. The administrator can query the search head 210 for customer ID field value matches across the log data from the three systems that are stored at the one or more indexers 206. The customer ID field value exists in the data gathered from the three systems, but the customer ID field value may be located in different areas of the data given differences in the architecture of the systems—there is a semantic relationship between the customer ID field values generated by the three systems. The search head 210 requests event data from the one or more indexers 206 to gather relevant event data from the three systems. It then applies extraction rules to the event data in order to extract field values that it can correlate. The search head may apply a different extraction rule to each set of events from each system when the event data format differs among systems. In this example, the user interface can display to the administrator the event data corresponding to the common customer ID field values 507, 508, and 509, thereby providing the administrator with insight into a customer's experience.

Note that query results can be returned to a client, a search head, or any other system component for further processing. In general, query results may include a set of one or more events, a set of one or more values obtained from the events, a subset of the values, statistics calculated based on the values, a report containing the values, or a visualization, such as a graph or chart, generated from the values.

2.8. Example Search Screen

Figure 6A:
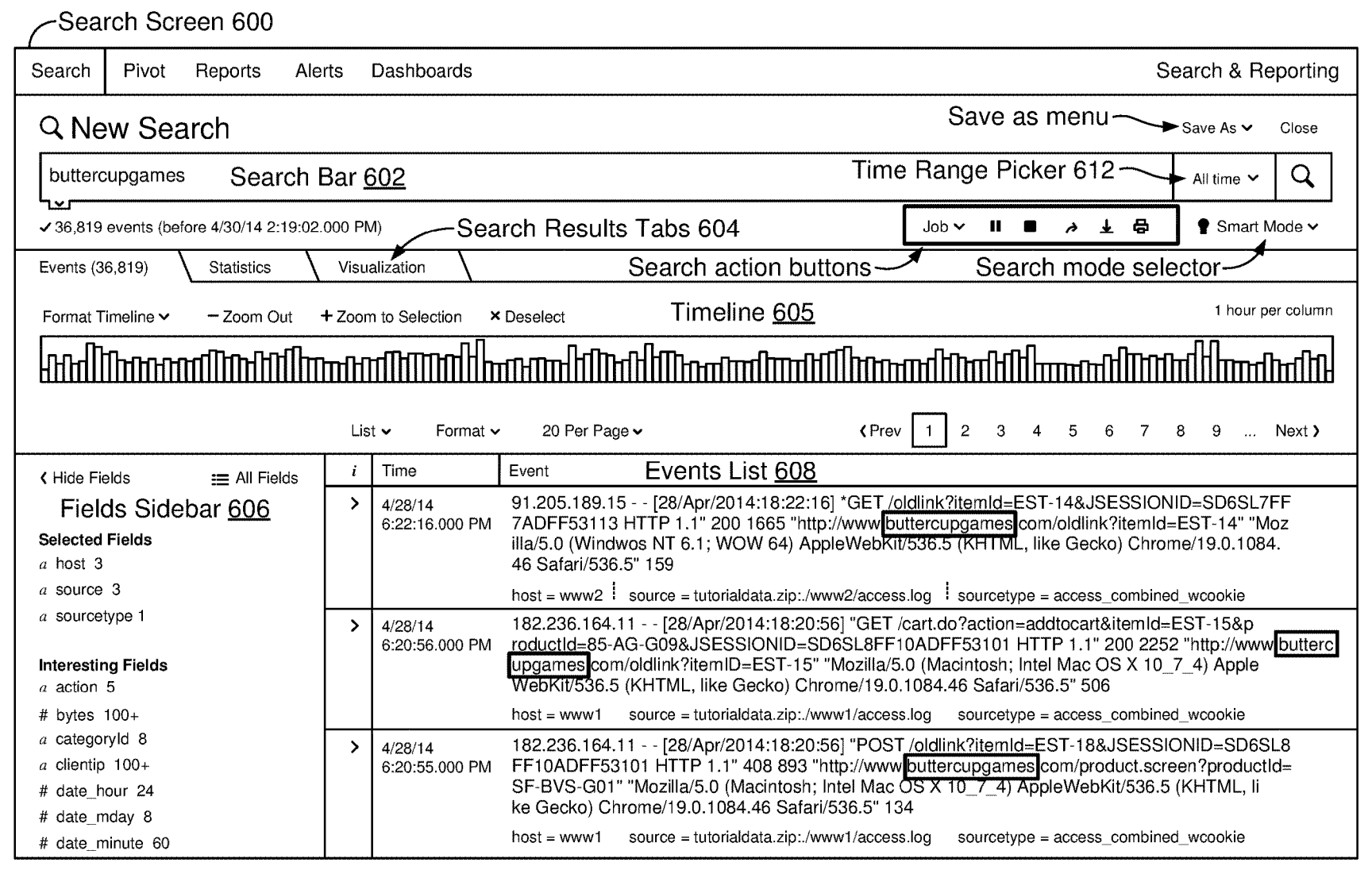

FIG. 6A illustrates an example search screen 600 in accordance with the disclosed embodiments. Search screen 600 includes a search bar 602 that accepts user input in the form of a search string. It also includes a time range picker 612 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 600 also initially displays a "data summary" dialog as is illustrated in FIG. 6B that enables the user to select different sources for the event data, such as by selecting specific hosts and log files.

After the search is executed, the search screen 600 in FIG. 6A can display the results through search results tabs 604, wherein search results tabs 604 includes: an "events tab" that displays various information about events returned by the search; a "statistics tab" that displays statistics about the search results; and a "visualization tab" that displays various visualizations of the search results. The events tab illustrated in FIG. 6A displays a timeline graph 605 that graphically illustrates the number of events that occurred in one-hour intervals over the selected time range. It also displays an events list 608 that enables a user to view the raw data in each of the returned events. It additionally displays a fields sidebar 606 that includes statistics about occurrences of specific fields in the returned events, including "selected fields" that are pre-selected by the user, and "interesting fields" that are automatically selected by the system based on pre-specified criteria.

2.9. Data Models

A data model is a hierarchically structured search-time mapping of semantic knowledge about one or more datasets.

It encodes the domain knowledge necessary to build a variety of specialized searches of those datasets. Those searches, in turn, can be used to generate reports.

A data model is composed of one or more "objects" (or "data model objects") that define or otherwise correspond to a specific set of data.

Objects in data models can be arranged hierarchically in parent/child relationships. Each child object represents a subset of the dataset covered by its parent object. The top-level objects in data models are collectively referred to as "root objects."

Child objects have inheritance. Data model objects are defined by characteristics that mostly break down into constraints and attributes. Child objects inherit constraints and attributes from their parent objects and have additional constraints and attributes of their own. Child objects provide a way of filtering events from parent objects. Because a child object always provides an additional constraint in addition to the constraints it has inherited from its parent object, the dataset it represents is always a subset of the dataset that its parent represents.

For example, a first data model object may define a broad set of data pertaining to e-mail activity generally, and another data model object may define specific datasets within the broad dataset, such as a subset of the e-mail data pertaining specifically to e-mails sent. Examples of data models can include electronic mail, authentication, databases, intrusion detection, malware, application state, alerts, compute inventory, network sessions, network traffic, performance, audits, updates, vulnerabilities, etc. Data models and their objects can be designed by knowledge managers in an organization, and they can enable downstream users to quickly focus on a specific set of data. For example, a user can simply select an "e-mail activity" data model object to access a dataset relating to e-mails generally (e.g., sent or received), or select an "e-mails sent" data model object (or data sub-model object) to access a dataset relating to e-mails sent.

A data model object may be defined by (1) a set of search constraints, and (2) a set of fields. Thus, a data model object can be used to quickly search data to identify a set of events and to identify a set of fields to be associated with the set of events. For example, an "e-mails sent" data model object may specify a search for events relating to e-mails that have been sent, and specify a set of fields that are associated with the events. Thus, a user can retrieve and use the "e-mails sent" data model object to quickly search source data for events relating to sent e-mails, and may be provided with a listing of the set of fields relevant to the events in a user interface screen.

A child of the parent data model may be defined by a search (typically a narrower search) that produces a subset of the events that would be produced by the parent data model's search. The child's set of fields can include a subset of the set of fields of the parent data model and/or additional fields. Data model objects that reference the subsets can be arranged in a hierarchical manner, so that child subsets of events are proper subsets of their parents. A user iteratively applies a model development tool (not shown in Fig.) to prepare a query that defines a subset of events and assigns an object name to that subset. A child subset is created by further limiting a query that generated a parent subset. A late-binding schema of field extraction rules is associated with each object or subset in the data model.

Data definitions in associated schemas can be taken from the common information model (CIM) or can be devised for a particular schema and optionally added to the CIM. Child objects inherit fields from parents and can include fields not present in parents. A model developer can select fewer extraction rules than are available for the sources returned by the query that defines events belonging to a model. Selecting a limited set of extraction rules can be a tool for simplifying and focusing the data model, while allowing a user flexibility to explore the data subset. Development of a data model is further explained in U.S. Pat. Nos. 8,788,525 and 8,788,526, both entitled "DATA MODEL FOR MACHINE DATA FOR SEMANTIC SEARCH", both issued on 22 Jul. 2014, U.S. Pat. No. 8,983,994, entitled "GENERATION OF A DATA MODEL FOR SEARCHING MACHINE DATA", issued on 17 Mar. 2015, U.S. patent application Ser. No. 14/611,232, entitled "GENERATION OF A DATA MODEL APPLIED TO QUERIES", filed on 31 Jan. 2015, and U.S. patent application Ser. No. 14/815,884, entitled "GENERATION OF A DATA MODEL APPLIED TO OBJECT QUERIES", filed on 31 Jul. 2015, each of which is hereby incorporated by reference in its entirety for all purposes. See, also, Knowledge Manager Manual, Build a Data Model, Splunk Enterprise 6.1.3 pp. 150-204 (Aug. 25, 2014).

A data model can also include reports. One or more report formats can be associated with a particular data model and be made available to run against the data model. A user can use child objects to design reports with object datasets that already have extraneous data pre-filtered out. In an embodiment, the data intake and query system 108 provides the user with the ability to produce reports (e.g., a table, chart, visualization, etc.) without having to enter SPL, SQL, or other query language terms into a search screen. Data models are used as the basis for the search feature.

Data models may be selected in a report generation interface. The report generator supports drag-and-drop organization of fields to be summarized in a report. When a model is selected, the fields with available extraction rules are made available for use in the report. The user may refine and/or filter search results to produce more precise reports. The user may select some fields for organizing the report and select other fields for providing detail according to the report organization. For example, "region" and "salesperson" are fields used for organizing the report and sales data can be summarized (subtotaled and totaled) within this organization. The report generator allows the user to specify one or more fields within events and apply statistical analysis on values extracted from the specified one or more fields. The report generator may aggregate search results across sets of events and generate statistics based on aggregated search results. Building reports using the report generation interface is further explained in U.S. patent application Ser. No. 14/503,335, entitled "GENERATING REPORTS FROM UNSTRUCTURED DATA", filed on 30 Sep. 2014, and which is hereby incorporated by reference in its entirety for all purposes, and in Pivot Manual, Splunk Enterprise 6.1.3 (Aug. 4, 2014). Data visualizations also can be generated in a variety of formats, by reference to the data model. Reports, data visualizations, and data model objects can be saved and associated with the data model for future use. The data model object may be used to perform searches of other data.

2.10. Acceleration Technique

The above-described system provides significant flexibility by enabling a user to analyze massive quantities of minimally processed data "on the fly" at search time instead of storing pre-specified portions of the data in a database at ingestion time. This flexibility enables a user to see valuable insights, correlate data, and perform subsequent queries to examine interesting aspects of the data that may not have been apparent at ingestion time.

However, performing extraction and analysis operations at search time can involve a large amount of data and require a large number of computational operations, which can cause delays in processing the queries. Advantageously, SPLUNK® ENTERPRISE system employs a number of unique acceleration techniques that have been developed to speed up analysis operations performed at search time. These techniques include: (1) performing search operations in parallel across multiple indexers; (2) using a keyword index; (3) using a high-performance analytics store; and (4) accelerating the process of generating reports. These novel techniques are described in more detail below.

2.10.1. Aggregation Technique

Figure 7:
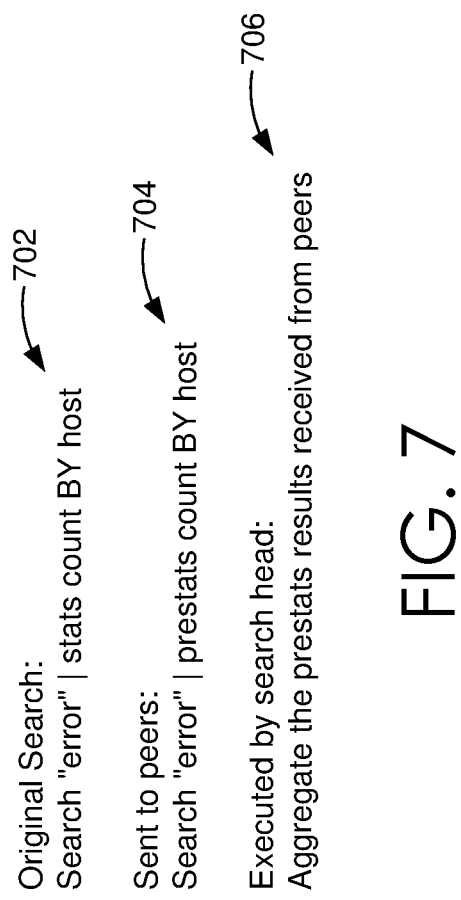
FIG. 7 illustrates an example search query received from a client and executed by search peers in accordance with the disclosed embodiments.

To facilitate faster query processing, a query can be structured such that multiple indexers perform the query in parallel, while aggregation of search results from the multiple indexers is performed locally at the search head. For example, FIG. 7 illustrates how a search query 702 received from a client at a search head 210 can split into two phases, including: (1) subtasks 704 (e.g., data retrieval or simple filtering) that may be performed in parallel by indexers 206 for execution, and (2) a search results aggregation operation 706 to be executed by the search head when the results are ultimately collected from the indexers.

During operation, upon receiving search query 702, a search head 210 determines that a portion of the operations involved with the search query may be performed locally by the search head. The search head modifies search query 702 by substituting "stats" (create aggregate statistics over results sets received from the indexers at the search head) with "prestats" (create statistics by the indexer from local results set) to produce search query 704, and then distributes search query 704 to distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as illustrated in FIG. 4, or may alternatively distribute a modified version (e.g., a more restricted version) of the search query to the search peers. In this example, the indexers are responsible for producing the results and sending them to the search head. After the indexers return the results to the search head, the search head aggregates the received results 706 to form a single search result set. By executing the query in this manner, the system effectively distributes the computational operations across the indexers while minimizing data transfers.

2.10.2. Keyword Index

As described above with reference to the flow charts in FIG. 3 and FIG. 4, data intake and query system 108 can construct and maintain one or more keyword indices to quickly identify events containing specific keywords. This technique can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

2.10.3. High Performance Analytics Store

To speed up certain types of queries, some embodiments of system 108 create a high-performance analytics store, which is referred to as a "summarization table," that contains entries for specific field-value pairs. Each of these entries keeps track of instances of a specific value in a specific field in the event data and includes references to events containing the specific value in the specific field. For example, an example entry in a summarization table can keep track of occurrences of the value "94107" in a "ZIP code" field of a set of events and the entry includes references to all of the events that contain the value "94107" in the ZIP code field. This optimization technique enables the system to quickly process queries that seek to determine how many events have a particular value for a particular field. To this end, the system can examine the entry in the summarization table to count instances of the specific value in the field without having to go through the individual events or perform data extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range. A bucket-specific summarization table includes entries for specific field-value combinations that occur in events in the specific bucket. Alternatively, the system can maintain a separate summarization table for each indexer. The indexer-specific summarization table includes entries for the events in a data store that are managed by the specific indexer. Indexer-specific summarization tables may also be bucket-specific.

The summarization table can be populated by running a periodic query that scans a set of events to find instances of a specific field-value combination, or alternatively instances of all field-value combinations for a specific field. A periodic query can be initiated by a user, or can be scheduled to occur automatically at specific time intervals. A periodic query can also be automatically launched in response to a query that asks for a specific field-value combination.

In some cases, when the summarization tables may not cover all of the events that are relevant to a query, the system can use the summarization tables to obtain partial results for the events that are covered by summarization tables, but may also have to search through other events that are not covered by the summarization tables to produce additional results. These additional results can then be combined with the partial results to produce a final set of results for the query. The summarization table and associated techniques are described in more detail in U.S. Pat. No. 8,682,925, entitled "DISTRIBUTED HIGH PERFORMANCE ANALYTICS STORE", issued on 25 Mar. 2014, U.S. patent application Ser. No. 14/170,159, entitled "SUPPLEMENTING A HIGH PERFORMANCE ANALYTICS STORE WITH EVALUATION OF INDIVIDUAL EVENTS TO RESPOND TO AN EVENT QUERY", filed on 31 Jan. 2014, and U.S. patent application Ser. No. 14/815,973, entitled "STORAGE MEDIUM AND CONTROL DEVICE", filed on 21 Feb. 2014, each of which is hereby incorporated by reference in its entirety.

2.10.4. Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. If reports can be accelerated, the summarization engine periodically generates a summary covering data obtained during a latest non-overlapping time period. For example, where the query seeks events meeting one or more specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In addition to the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so advantageously only the newer event data needs to be processed while generating an updated report. These report acceleration techniques are described in more detail in U.S. Pat. No. 8,589,403, entitled "COMPRESSED JOURNALING IN EVENT TRACKING FILES FOR METADATA RECOVERY AND REPLICATION", issued on 19 Nov. 2013, U.S. Pat. No. 8,412,696, entitled "REAL TIME SEARCHING AND REPORTING", issued on 2 Apr. 2011, and U.S. Pat. Nos. 8,589,375 and 8,589,432, both also entitled "REAL TIME SEARCHING AND REPORTING", both issued on 19 Nov. 2013, each of which is hereby incorporated by reference in its entirety.

2.11. Security Features

The SPLUNK® ENTERPRISE platform provides various schemas, dashboards and visualizations that simplify developers' task to create applications with additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. SPLUNK® APP FOR ENTERPRISE SECURITY provides the security practitioner with visibility into security-relevant threats found in the enterprise infrastructure by capturing, monitoring, and reporting on data from enterprise security devices, systems, and applications. Through the use of SPLUNK® ENTERPRISE searching and reporting capabilities, SPLUNK® APP FOR ENTERPRISE SECURITY provides a top-down and bottom-up view of an organization's security posture.

The SPLUNK® APP FOR ENTERPRISE SECURITY leverages SPLUNK® ENTERPRISE search-time normalization techniques, saved searches, and correlation searches to provide visibility into security-relevant threats and activity and generate notable events for tracking. The App enables the security practitioner to investigate and explore the data to find new or unknown threats that do not follow signature-based patterns.

Conventional Security Information and Event Management (SIEM) systems that lack the infrastructure to effectively store and analyze large volumes of security-related data. Traditional SIEM systems typically use fixed schemas to extract data from pre-defined security-related fields at data ingestion time and storing the extracted data in a relational database. This traditional data extraction process (and associated reduction in data size) that occurs at data ingestion time inevitably hampers future incident investigations that may need original data to determine the root cause of a security issue, or to detect the onset of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data and enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. The process of detecting security threats for network-related information is further described in U.S. Pat. No. 8,826,434, entitled "SECURITY THREAT DETECTION BASED ON INDICATIONS IN BIG DATA OF ACCESS TO NEWLY REGISTERED DOMAINS", issued on 2 Sep. 2014, U.S. patent application Ser. No. 13/956,252, entitled "INVESTIGATIVE AND DYNAMIC DETECTION OF POTENTIAL SECURITY-THREAT INDICATORS FROM EVENTS IN BIG DATA", filed on 31 Jul. 2013, U.S. patent application Ser. No. 14/445,018, entitled "GRAPHIC DISPLAY OF SECURITY THREATS BASED ON INDICATIONS OF ACCESS TO NEWLY REGISTERED DOMAINS", filed on 28 Jul. 2014, U.S. patent application Ser. No. 14/445,023, entitled "SECURITY THREAT DETECTION OF NEWLY REGISTERED DOMAINS", filed on 28 Jul. 2014, U.S. patent application Ser. No. 14/815,971, entitled "SECURITY THREAT DETECTION USING DOMAIN NAME ACCESSES", filed on 1 Aug. 2015, and U.S. patent application Ser. No. 14/815,972, entitled "SECURITY THREAT DETECTION USING DOMAIN NAME REGISTRATIONS", filed on 1 Aug. 2015, each of which is hereby incorporated by reference in its entirety for all purposes. Security-related information can also include malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting "notable events"

that are likely to indicate a security threat. These notable events can be detected in a number of ways: (1) a user can notice a correlation in the data and can manually identify a corresponding group of one or more events as "notable;" or (2) a user can define a "correlation search" specifying criteria for a notable event, and every time one or more events satisfy the criteria, the application can indicate that the one or more events are notable. A user can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 8A:
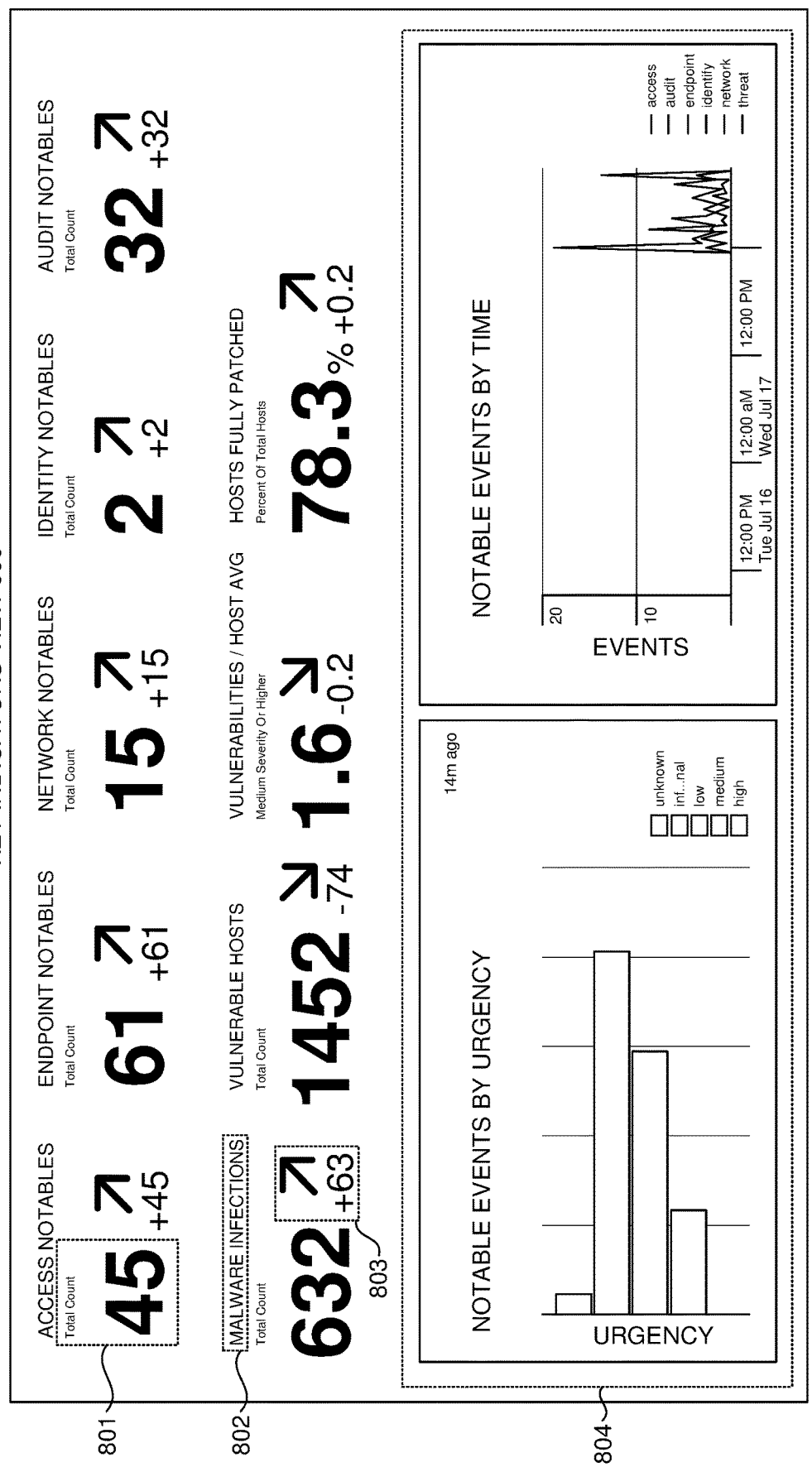
FIG. 8A illustrates a key indicators view in accordance with the disclosed embodiments.

The SPLUNK® APP FOR ENTERPRISE SECURITY provides various visualizations to aid in discovering security threats, such as a "key indicators view" that enables a user to view security metrics, such as counts of different types of notable events. For example, FIG. 8A illustrates an example key indicators view 800 that comprises a dashboard, which can display a value 801, for various security-related metrics, such as malware infections 802. It can also display a change in a metric value 803, which indicates that the number of malware infections increased by 63 during the preceding interval. Key indicators view 800 additionally displays a histogram panel 804 that displays a histogram of notable events organized by urgency values, and a histogram of notable events organized by time intervals. This key indicators view is described in further detail in pending U.S. patent application Ser. No. 13/956,338, entitled "KEY INDICATORS VIEW", filed on 31 Jul. 2013, and which is hereby incorporated by reference in its entirety for all purposes.

Figure 8B:
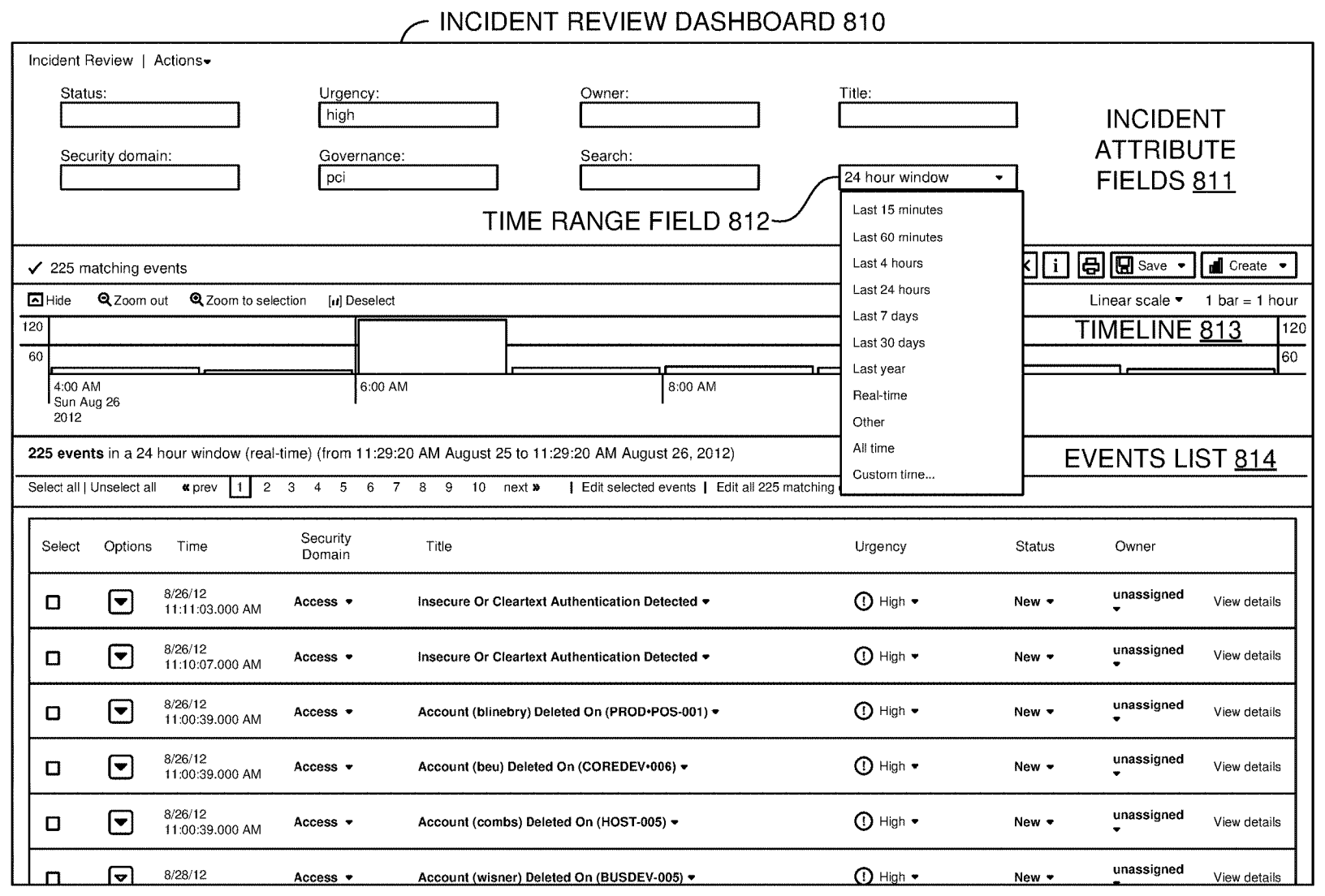

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 8B illustrates an example incident review dashboard 810 that includes a set of incident attribute fields 811 that, for example, enables a user to specify a time range field 812 for the displayed events. It also includes a timeline 813 that graphically illustrates the number of incidents that occurred in time intervals over the selected time range. It additionally displays an events list 814 that enables a user to view a list of all of the notable events that match the criteria in the incident attributes fields 811. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event.

2.12. Data Center Monitoring

As mentioned above, the SPLUNK® ENTERPRISE platform provides various features that simplify the developers' task to create various applications. One such application is SPLUNK® APP FOR VMWARE® that provides operational visibility into granular performance metrics, logs, tasks and events, and topology from hosts, virtual machines and virtual centers. It empowers administrators with an accurate real-time picture of the health of the environment, proactively identifying performance and capacity bottlenecks.

Conventional data-center-monitoring systems lack the infrastructure to effectively store and analyze large volumes of machine-generated data, such as performance information and log data obtained from the data center. In conventional data-center-monitoring systems, machine-generated data is typically pre-processed prior to being stored, for example, by extracting pre-specified data items and storing them in a database to facilitate subsequent retrieval and analysis at search time. However, the rest of the data is not saved and discarded during pre-processing.

In contrast, the SPLUNK® APP FOR VMWARE® stores large volumes of minimally processed machine data, such as performance information and log data, at ingestion time for later retrieval and analysis at search time when a live performance issue is being investigated. In addition to data obtained from various log files, this performance-related information can include values for performance metrics obtained through an application programming interface (API) provided as part of the vSphere Hypervisor™ system distributed by VMware, Inc. of Palo Alto, Calif. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. Such performance metrics are described in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

To facilitate retrieving information of interest from performance data and log files, the SPLUNK® APP FOR VMWARE® provides pre-specified schemas for extracting relevant values from different types of performance-related event data, and also enables a user to define such schemas.

Figure 8C:
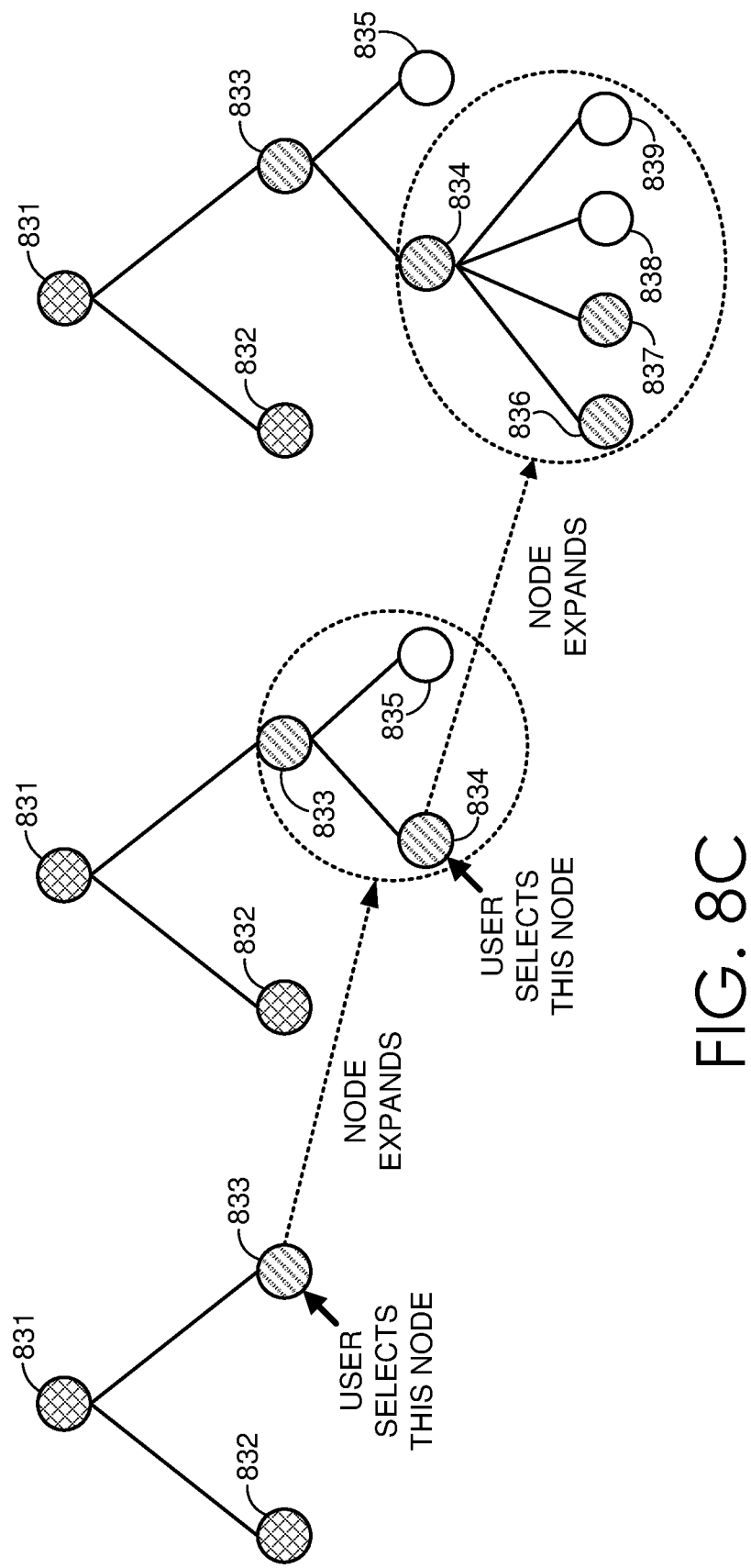
FIG. 8C illustrates a proactive monitoring tree in accordance with the disclosed embodiments.

The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Example node-expansion operations are illustrated in FIG. 8C, wherein nodes 833 and 834 are selectively expanded. Note that nodes 831-839 can be displayed using different patterns or colors to represent different performance states, such as a critical state, a warning state, a normal state or an unknown/offline state. The ease of navigation provided by selective expansion in combination with the associated performance-state information enables a user to quickly diagnose the root cause of a performance problem. The proactive monitoring tree is described in further detail in U.S. patent application Ser. No. 14/253,490, entitled "PROACTIVE MONITORING TREE WITH SEVERITY STATE SORTING", filed on 15 Apr. 2014, and U.S. patent application Ser. No. 14/812,948, also entitled "PROACTIVE MONITORING TREE WITH SEVERITY STATE SORTING", filed on 29 Jul. 2015, each of which is hereby incorporated by reference in its entirety for all purposes.

Figure 8D:
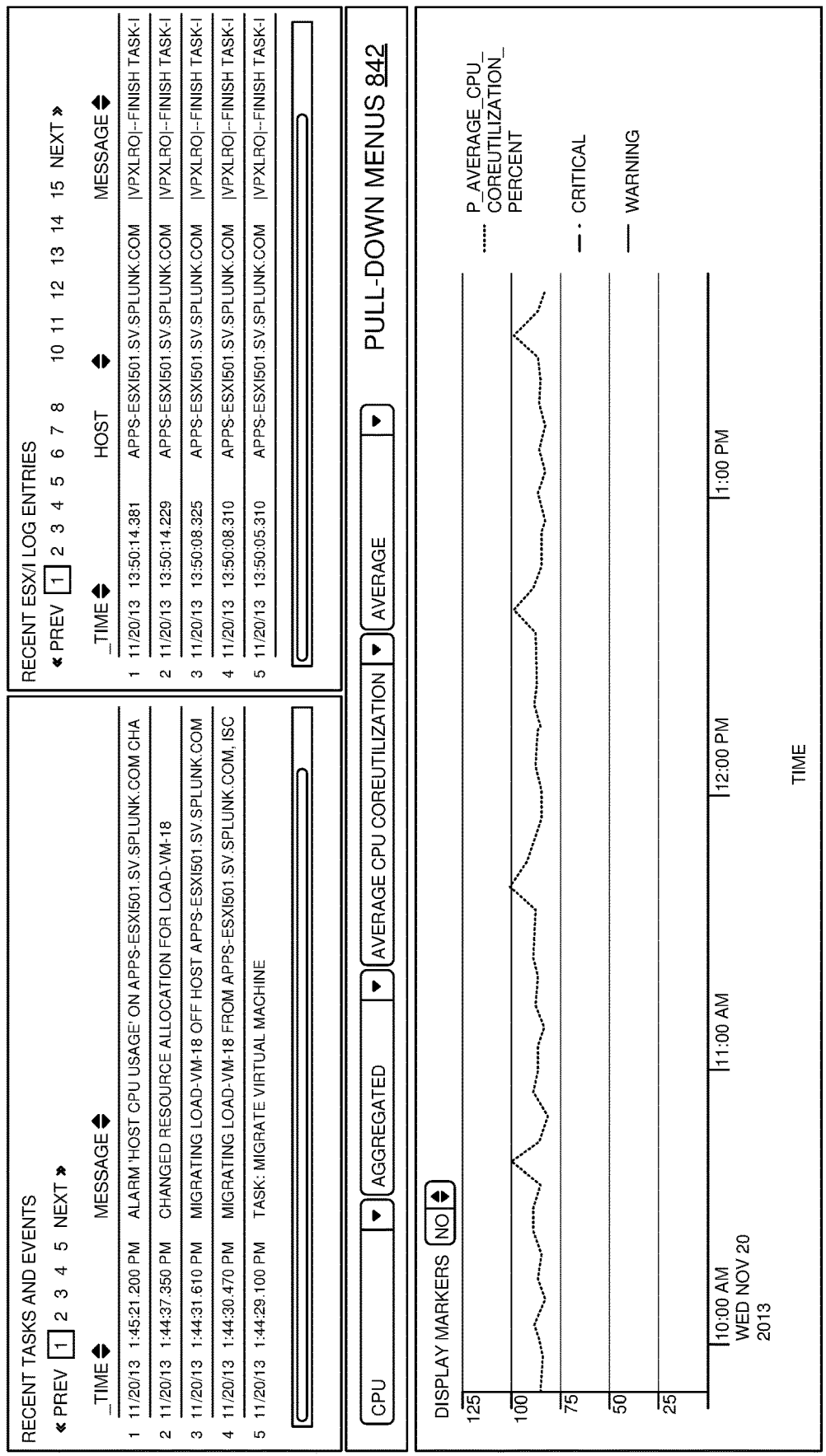
FIG. 8D illustrates a user interface screen displaying both log data and performance data in accordance with the disclosed embodiments.

The SPLUNK® APP FOR VMWARE® also provides a user interface that enables a user to select a specific time range and then view heterogeneous data comprising events, log data, and associated performance metrics for the selected time range. For example, the screen illustrated in FIG. 8D displays a listing of recent "tasks and events" and a listing of recent "log entries" for a selected time range above a performance-metric graph for "average CPU core utilization" for the selected time range. Note that a user is able to operate pull-down menus 842 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

2.13. Cloud-Based System Overview

The example data intake and query system 108 described in reference to FIG. 2 comprises several system components, including one or more forwarders, indexers, and search heads. In some environments, a user of a data intake and query system 108 may install and configure, on computing devices owned and operated by the user, one or more software applications that implement some or all of these system components. For example, a user may install a software application on server computers owned by the user and configure each server to operate as one or more of a forwarder, an indexer, a search head, etc. This arrangement generally may be referred to as an "on-premises" solution. That is, the system 108 is installed and operates on computing devices directly controlled by the user of the system. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 108 operate.

In one embodiment, to provide an alternative to an entirely on-premises environment for system 108, one or more of the components of a data intake and query system instead may be provided as a cloud-based service. In this context, a cloud-based service refers to a service hosted by one more computing resources that are accessible to end users over a network, for example, by using a web browser or other application on a client device to interface with the remote computing resources. For example, a service provider may provide a cloud-based data intake and query system by managing computing resources configured to implement various aspects of the system (e.g., forwarders, indexers, search heads, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

Figure 9:
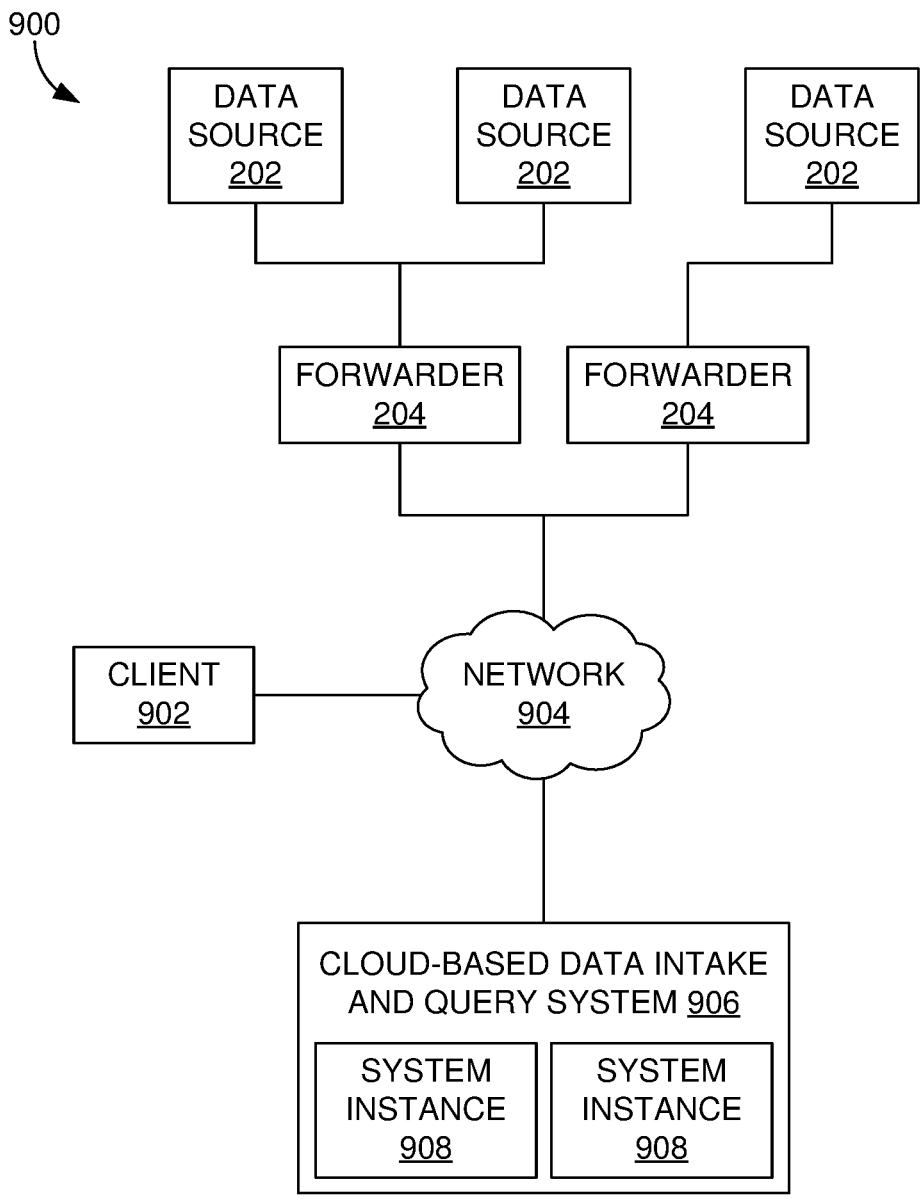
FIG. 9 illustrates a block diagram of an example cloud-based data intake and query system in which an embodiment may be implemented.

FIG. 9 illustrates a block diagram of an example cloud-based data intake and query system. Similar to the system of FIG. 2, the networked computer system 900 includes input data sources 202 and forwarders 204. These input data sources and forwarders may be in a subscriber's private computing environment. Alternatively, they might be directly managed by the service provider as part of the cloud service. In the example system 900, one or more forwarders 204 and client devices 902 are coupled to a cloud-based data intake and query system 906 via one or more networks 904. Network 904 broadly represents one or more LANs, WANs, cellular networks, intranetworks, internetworks, etc., using any of wired, wireless, terrestrial microwave, satellite links, etc., and may include the public Internet, and is used by client devices 902 and forwarders 204 to access the system 906. Similar to the system of 108, each of the forwarders 204 may be configured to receive data from a data source and to forward the data to other components of the system 906 for further processing.

In an embodiment, a cloud-based data intake and query system 906 may comprise a plurality of system instances 908. In general, each system instance 908 may include one or more computing resources managed by a provider of the cloud-based system 906 made available to a particular subscriber. The computing resources comprising a system instance 908 may, for example, include one or more servers or other devices configured to implement one or more forwarders, indexers, search heads, and other components of a data intake and query system, similar to system 108. As indicated above, a subscriber may use a web browser or other application of a client device 902 to access a web portal or other interface that enables the subscriber to configure an instance 908.

Providing a data intake and query system as described in reference to system 108 as a cloud-based service presents a number of challenges. Each of the components of a system 108 (e.g., forwarders, indexers and search heads) may at times refer to various configuration files stored locally at each component. These configuration files typically may involve some level of user configuration to accommodate particular types of data a user desires to analyze and to account for other user preferences. However, in a cloud-based service context, users typically may not have direct access to the underlying computing resources implementing the various system components (e.g., the computing resources comprising each system instance 908) and may desire to make such configurations indirectly, for example, using one or more web-based interfaces. Thus, the techniques and systems described herein for providing user interfaces that enable a user to configure source type definitions are applicable to both on-premises and cloud-based service contexts, or some combination thereof (e.g., a hybrid system where both an on-premises environment such as SPLUNK® ENTERPRISE and a cloud-based environment such as SPLUNK CLOUD™ are centrally visible).

2.14. Searching Externally Archived Data

Figure 10:
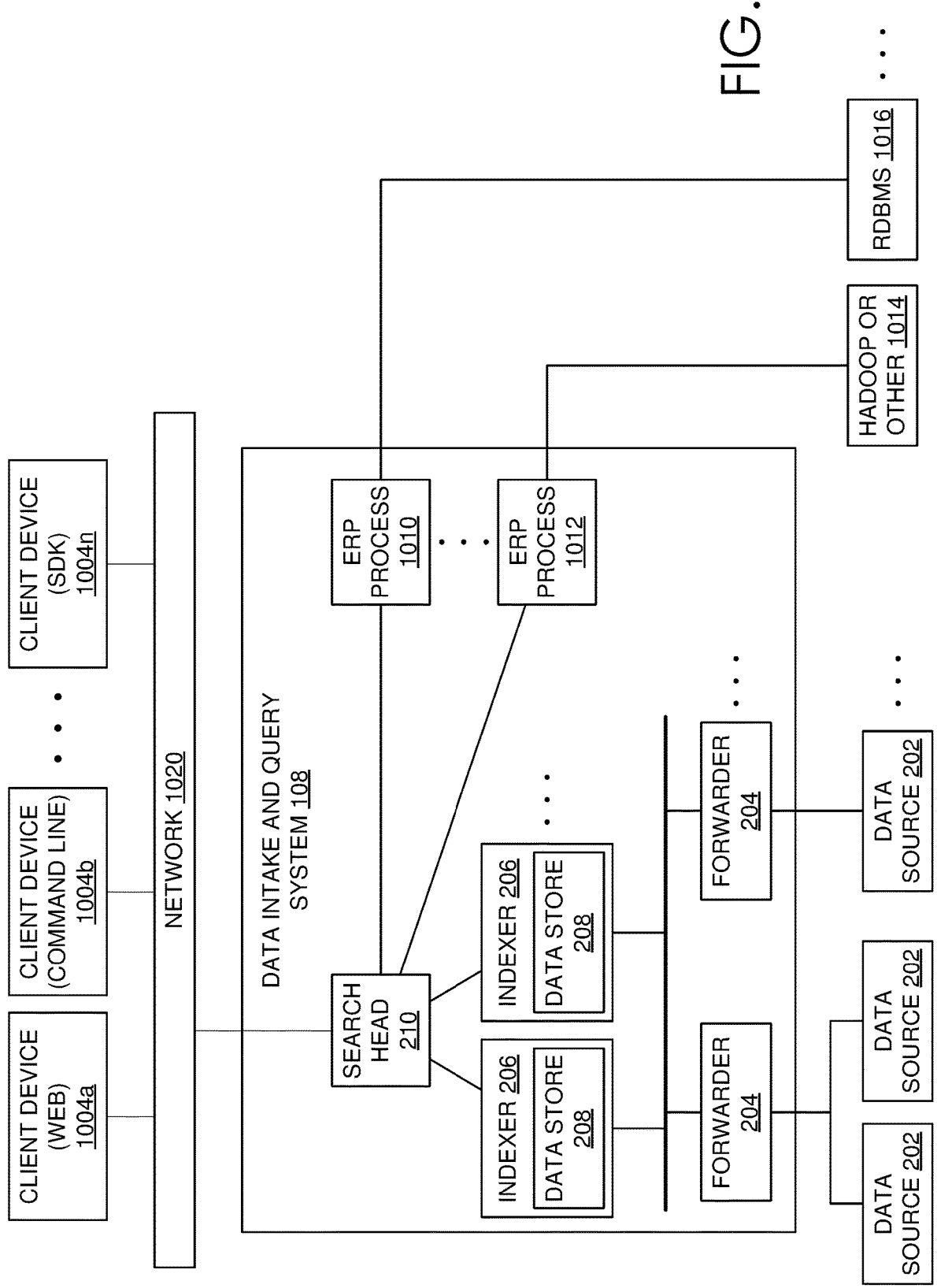
FIG. 10 illustrates a block diagram of an example data intake and query system that performs searches across external data systems in accordance with the disclosed embodiments.

FIG. 10 shows a block diagram of an example of a data intake and query system 108 that provides transparent search facilities for data systems that are external to the data intake and query system. Such facilities are available in the HUNK® system provided by Splunk Inc. of San Francisco, Calif. HUNK® represents an analytics platform that enables business and IT teams to rapidly explore, analyze, and visualize data in Hadoop and NoSQL data stores.

The search head 210 of the data intake and query system receives search requests from one or more client devices 1004 over network connections 1020. As discussed above, the data intake and query system 108 may reside in an enterprise location, in the cloud, etc. FIG. 10 illustrates that multiple client devices 1004a, 1004b, . . . , 1004n may communicate with the data intake and query system 108. The client devices 1004 may communicate with the data intake and query system using a variety of connections. For example, one client device in FIG. 10 is illustrated as communicating over an Internet (Web) protocol, another client device is illustrated as communicating via a command line interface, and another client device is illustrated as communicating via a system developer kit (SDK).

The search head 210 analyzes the received search request to identify request parameters. If a search request received from one of the client devices 1004 references an index maintained by the data intake and query system, then the search head 210 connects to one or more indexers 206 of the data intake and query system for the index referenced in the request parameters. That is, if the request parameters of the search request reference an index, then the search head accesses the data in the index via the indexer. The data intake and query system 108 may include one or more indexers 206, depending on system access resources and requirements. As described further below, the indexers 206 retrieve data from their respective local data stores 208 as specified in the search request. The indexers and their respective data stores can comprise one or more storage devices and typically reside on the same system, though they may be connected via a local network connection.

If the request parameters of the received search request reference an external data collection, which is not accessible to the indexers 206 or under the management of the data intake and query system, then the search head 210 can access the external data collection through an External Result Provider (ERP) process 1010. An external data collection may be referred to as a "virtual index" (plural, "virtual indices"). An ERP process provides an interface through which the search head 210 may access virtual indices.

Thus, a search reference to an index of the system relates to a locally stored and managed data collection. In contrast, a search reference to a virtual index relates to an externally stored and managed data collection, which the search head may access through one or more ERP processes 1010, 1012. FIG. 10 shows two ERP processes 1010, 1012 that connect to respective remote (external) virtual indices, which are indicated as a Hadoop or another system 1014 (e.g., AMAZON S3 system, AMAZON EMR system, other Hadoop Compatible File Systems (HCFS), etc.) and a relational database management system (RDBMS) 1016. Other virtual indices may include other file organizations and protocols, such as Structured Query Language (SQL) and the like. The ellipses between the ERP processes 1010, 1012 indicate optional additional ERP processes of the data intake and query system 108. An ERP process may be a computer process that is initiated or spawned by the search head 210 and is executed by the search data intake and query system 108. Alternatively or additionally, an ERP process may be a process spawned by the search head 210 on the same or different host system as the search head 210 resides.

The search head 210 may spawn a single ERP process in response to multiple virtual indices referenced in a search request, or the search head may spawn different ERP processes for different virtual indices. Generally, virtual indices that share common data configurations or protocols may share ERP processes. For example, all search query references to a Hadoop file system may be processed by the same ERP process, if the ERP process is suitably configured. Likewise, all search query references to an SQL database may be processed by the same ERP process. In addition, the search head may provide a common ERP process for common external data source types (e.g., a common vendor may utilize a common ERP process, even if the vendor includes different data storage system types, such as Hadoop and SQL). Common indexing schemes also may be handled by common ERP processes, such as flat text files or Weblog files.

The search head 210 determines the number of ERP processes to be initiated via the use of configuration parameters that are included in a search request message. Generally, there is a one-to-many relationship between an external results provider "family" and ERP processes. There is also a one-to-many relationship between an ERP process and corresponding virtual indices that are referred to in a search request. For example, using RDBMS, assume two independent instances of such a system by one vendor, such as one RDBMS for production and another RDBMS used for development. In such a situation, it is likely preferable (but optional) to use two ERP processes to maintain the independent operation as between production and development data. Both of the ERPs, however, will belong to the same family, because the two RDBMS system types are from the same vendor.

The ERP processes 1010, 1012 receive a search request from the search head 210. The search head may optimize the received search request for execution at the respective external virtual index. Alternatively, the ERP process may receive a search request as a result of analysis performed by the search head or by a different system process. The ERP processes 1010, 1012 can communicate with the search head 210 via conventional input/output routines (e.g., standard in/standard out, etc.). In this way, the ERP process receives the search request from a client device such that the search request may be efficiently executed at the corresponding external virtual index.

The ERP processes 1010, 1012 may be implemented as a process of the data intake and query system. Each ERP process may be provided by the data intake and query system, or may be provided by process or application providers who are independent of the data intake and query system. Each respective ERP process may include an interface application installed at a computer of the external result provider that ensures proper communication between the search support system and the external result provider. The ERP processes 1010, 1012 generate appropriate search requests in the protocol and syntax of the respective virtual indices 1014, 1016, each of which corresponds to the search request received by the search head 210. Upon receiving search results from their corresponding virtual indices, the respective ERP process passes the result to the search head 210, which may return or display the results or a processed set of results based on the returned results to the respective client device.

Client devices 1004 may communicate with the data intake and query system 108 through a network interface 1020, e.g., one or more LANs, WANs, cellular networks, intranetworks, and/or internetworks using any of wired, wireless, terrestrial microwave, satellite links, etc., and may include the public Internet.

The analytics platform utilizing the External Result Provider process described in more detail in U.S. Pat. No. 8,738,629, entitled "EXTERNAL RESULT PROVIDED PROCESS FOR RETRIEVING DATA STORED USING A DIFFERENT CONFIGURATION OR PROTOCOL", issued on 27 May 2014, U.S. Pat. No. 8,738,587, entitled "PROCESSING A SYSTEM SEARCH REQUEST BY RETRIEVING RESULTS FROM BOTH A NATIVE INDEX AND A VIRTUAL INDEX", issued on 25 Jul. 2013, U.S. patent application Ser. No. 14/266,832, entitled "PROCESSING A SYSTEM SEARCH REQUEST ACROSS DISPARATE DATA COLLECTION SYSTEMS", filed on 1 May 2014, and U.S. patent application Ser. No. 14/449,144, entitled "PROCESSING A SYSTEM SEARCH REQUEST INCLUDING EXTERNAL DATA SOURCES", filed on 31 Jul. 2014, each of which is hereby incorporated by reference in its entirety for all purposes.

2.14.1. ERP Process Features

The ERP processes described above may include two operation modes: a streaming mode and a reporting mode. The ERP processes can operate in streaming mode only, in reporting mode only, or in both modes simultaneously. Operating in both modes simultaneously is referred to as mixed mode operation. In a mixed mode operation, the ERP at some point can stop providing the search head with streaming results and only provide reporting results thereafter, or the search head at some point may start ignoring streaming results it has been using and only use reporting results thereafter.

The streaming mode returns search results in real time, with minimal processing, in response to the search request. The reporting mode provides results of a search request with processing of the search results prior to providing them to the requesting search head, which in turn provides results to the requesting client device. ERP operation with such multiple modes provides greater performance flexibility with regard to report time, search latency, and resource utilization.

In a mixed mode operation, both streaming mode and reporting mode are operating simultaneously. The streaming mode results (e.g., the raw data obtained from the external data source) are provided to the search head, which can then process the results data (e.g., break the raw data into events, timestamp it, filter it, etc.) and integrate the results data with the results data from other external data sources, and/or from data stores of the search head. The search head performs such processing and can immediately start returning interim (streaming mode) results to the user at the requesting client device; simultaneously, the search head is waiting for the ERP process to process the data it is retrieving from the external data source as a result of the concurrently executing reporting mode.

In some instances, the ERP process initially operates in a mixed mode, such that the streaming mode operates to enable the ERP quickly to return interim results (e.g., some of the raw or unprocessed data necessary to respond to a search request) to the search head, enabling the search head to process the interim results and begin providing to the client or search requester interim results that are responsive to the query. Meanwhile, in this mixed mode, the ERP also operates concurrently in reporting mode, processing portions of raw data in a manner responsive to the search query. Upon determining that it has results from the reporting mode available to return to the search head, the ERP may halt processing in the mixed mode at that time (or some later time) by stopping the return of data in streaming mode to the search head and switching to reporting mode only. The ERP at this point starts sending interim results in reporting mode to the search head, which in turn may then present this processed data responsive to the search request to the client or search requester. Typically, the search head switches from using results from the ERP's streaming mode of operation to results from the ERP's reporting mode of operation when the higher bandwidth results from the reporting mode outstrip the amount of data processed by the search head in the streaming mode of ERP operation.

A reporting mode may have a higher bandwidth because the ERP does not have to spend time transferring data to the search head for processing all the raw data. In addition, the ERP may optionally direct another processor to do the processing.

The streaming mode of operation does not need to be stopped to gain the higher bandwidth benefits of a reporting mode; the search head could simply stop using the streaming mode results—and start using the reporting mode results—when the bandwidth of the reporting mode has caught up with or exceeded the amount of bandwidth provided by the streaming mode. Thus, a variety of triggers and ways to accomplish a search head's switch from using streaming mode results to using reporting mode results may be appreciated by one skilled in the art.

The reporting mode can involve the ERP process (or an external system) performing event breaking, time stamping, filtering of events to match the search query request, and calculating statistics on the results. The user can request particular types of data, such as if the search query itself involves types of events, or the search request may ask for statistics on data, such as on events that meet the search request. In either case, the search head understands the query language used in the received query request, which may be a proprietary language. One example query language is Splunk Processing Language (SPL) developed by the assignee of the application, Splunk Inc. The search head typically understands how to use that language to obtain data from the indexers, which store data in a format used by the SPLUNK® Enterprise system.

The ERP processes support the search head, as the search head is not ordinarily configured to understand the format in which data is stored in external data sources such as Hadoop or SQL data systems. Rather, the ERP process performs that translation from the query submitted in the search support system's native format (e.g., SPL if SPLUNK® ENTERPRISE is used as the search support system) to a search query request format that will be accepted by the corresponding external data system. The external data system typically stores data in a different format from that of the search support system's native index format, and it utilizes a different query language (e.g., SQL or MapReduce, rather than SPL or the like).

As noted, the ERP process can operate in the streaming mode alone. After the ERP process has performed the translation of the query request and received raw results from the streaming mode, the search head can integrate the returned data with any data obtained from local data sources (e.g., native to the search support system), other external data sources, and other ERP processes (if such operations were required to satisfy the terms of the search query). An advantage of mixed mode operation is that, in addition to streaming mode, the ERP process is also executing concurrently in reporting mode. Thus, the ERP process (rather than the search head) is processing query results (e.g., performing event breaking, timestamping, filtering, possibly calculating statistics if required to be responsive to the search query request, etc.). It should be apparent to those skilled in the art that additional time is needed for the ERP process to perform the processing in such a configuration. Therefore, the streaming mode will allow the search head to start returning interim results to the user at the client device before the ERP process can complete sufficient processing to start returning any search results. The switchover between streaming and reporting mode happens when the ERP process determines that the switchover is appropriate, such as when the ERP process determines it can begin returning meaningful results from its reporting mode.

The operation described above illustrates the source of operational latency: streaming mode has low latency (immediate results) and usually has relatively low bandwidth (fewer results can be returned per unit of time). In contrast, the concurrently running reporting mode has relatively high latency (it has to perform a lot more processing before returning any results) and usually has relatively high bandwidth (more results can be processed per unit of time). For example, when the ERP process does begin returning report results, it returns more processed results than in the streaming mode, because, e.g., statistics only need to be calculated to be responsive to the search request. That is, the ERP process doesn't have to take time to first return raw data to the search head. As noted, the ERP process could be configured to operate in streaming mode alone and return just the raw data for the search head to process in a way that is responsive to the search request. Alternatively, the ERP process can be configured to operate in the reporting mode only. Also, the ERP process can be configured to operate in streaming mode and reporting mode concurrently, as described, with the ERP process stopping the transmission of streaming results to the search head when the concurrently running reporting mode has caught up and started providing results. The reporting mode does not require the processing of all raw data that is responsive to the search query request before the ERP process starts returning results; rather, the reporting mode usually performs processing of chunks of events and returns the processing results to the search head for each chunk.

For example, an ERP process can be configured to merely return the contents of a search result file verbatim, with little or no processing of results. That way, the search head performs all processing (such as parsing byte streams into events, filtering, etc.). The ERP process can be configured to perform additional intelligence, such as analyzing the search request and handling all the computation that a native search indexer process would otherwise perform. In this way, the configured ERP process provides greater flexibility in features while operating according to desired preferences, such as response latency and resource requirements.

2.14. IT Service Monitoring

As previously mentioned, the SPLUNK® ENTERPRISE platform provides various schemas, dashboards and visualizations that make it easy for developers to create applications to provide additional capabilities. One such application is SPLUNK® IT SERVICE INTELLIGENCE™, which performs monitoring and alerting operations. It also includes analytics to help an analyst diagnose the root cause of performance problems based on large volumes of data stored by the SPLUNK® ENTERPRISE system as correlated to the various services an IT organization provides (a service-centric view). This differs significantly from conventional IT monitoring systems that lack the infrastructure to effectively store and analyze large volumes of service-related event data. Traditional service monitoring systems typically use fixed schemas to extract data from pre-defined fields at data ingestion time, wherein the extracted data is typically stored in a relational database. This data extraction process and associated reduction in data content that occurs at data ingestion time inevitably hampers future investigations, when all of the original data may be needed to determine the root cause of or contributing factors to a service issue.

In contrast, a SPLUNK® IT SERVICE INTELLIGENCE™ system stores large volumes of minimally-processed service-related data at ingestion time for later retrieval and analysis at search time, to perform regular monitoring, or to investigate a service issue. To facilitate this data retrieval process, SPLUNK® IT SERVICE INTELLIGENCE™ enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying all of the event data that pertains to the entity, whether produced by the entity itself or by another machine, and considering the many various ways the entity may be identified in raw machine data (such as by a URL, an IP address, or machine name) The service and entity definitions can organize event data around a service so that all of the event data pertaining to that service can be easily identified. This capability provides a foundation for the implementation of Key Performance Indicators.

One or more Key Performance Indicators (KPI's) are defined for a service within the SPLUNK® IT SERVICE INTELLIGENCE™ application. Each KPI measures an aspect of service performance at a point in time or over a period of time (aspect KPI's). Each KPI is defined by a search query that derives a KPI value from the machine data of events associated with the entities that provide the service. Information in the entity definitions may be used to identify the appropriate events at the time a KPI is defined or whenever a KPI value is being determined. The KPI values derived over time may be stored to build a valuable repository of current and historical performance information for the service, and the repository, itself, may be subject to search query processing. Aggregate KPIs may be defined to provide a measure of service performance calculated from a set of service aspect KPI values; this aggregate may even be taken across defined timeframes and/or across multiple services. A particular service may have an aggregate KPI derived from substantially all of the aspect KPI's of the service to indicate an overall health score for the service.

SPLUNK® IT SERVICE INTELLIGENCE™ facilitates the production of meaningful aggregate KPI's through a system of KPI thresholds and state values. Different KPI definitions may produce values in different ranges, and so the same value may mean something very different from one KPI definition to another. To address this, SPLUNK® IT SERVICE INTELLIGENCE™ implements a translation of individual KPI values to a common domain of "state" values. For example, a KPI range of values may be 1-100, or 50-275, while values in the state domain may be 'critical,' warning, 'normal,' and 'informational'. Thresholds associated with a particular KPI definition determine ranges of values for that KPI that correspond to the various state values. In one case, KPI values 95-100 may be set to correspond to 'critical' in the state domain. KPI values from disparate KPI's can be processed uniformly once they are translated into the common state values using the thresholds. For example, "normal 80% of the time" can be applied across various KPI's. To provide meaningful aggregate KPI's, a weighting value can be assigned to each KPI so that its influence on the calculated aggregate KPI value is increased or decreased relative to the other KPI's.

One service in an IT environment often impacts, or is impacted by, another service. SPLUNK® IT SERVICE INTELLIGENCE™ can reflect these dependencies. For example, a dependency relationship between a corporate e-mail service and a centralized authentication service can be reflected by recording an association between their respective service definitions. The recorded associations establish a service dependency topology that informs the data or selection options presented in a GUI, for example. (The service dependency topology is like a "map" showing how services are connected based on their dependencies.) The service topology may itself be depicted in a GUI and may be interactive to allow navigation among related services.

Entity definitions in SPLUNK® IT SERVICE INTELLIGENCE™ can include informational fields that can serve as metadata, implied data fields, or attributed data fields for the events identified by other aspects of the entity definition. Entity definitions in SPLUNK® IT SERVICE INTELLIGENCE™ can also be created and updated by an import of tabular data (as represented in a CSV, another delimited file, or a search query result set). The import may be GUI-mediated or processed using import parameters from a GUI-based import definition process. Entity definitions in SPLUNK® IT SERVICE INTELLIGENCE™ can also be associated with a service by means of a service definition rule. Processing the rule results in the matching entity definitions being associated with the service definition. The rule can be processed at creation time, and thereafter on a scheduled or on-demand basis. This allows dynamic, rule-based updates to the service definition.

During operation, SPLUNK® IT SERVICE INTELLIGENCE™ can recognize so-called "notable events" that may indicate a service performance problem or other situation of interest. These notable events can be recognized by a "correlation search" specifying trigger criteria for a notable event: every time KPI values satisfy the criteria, the application indicates a notable event. A severity level for the notable event may also be specified. Furthermore, when trigger criteria are satisfied, the correlation search may additionally or alternatively cause a service ticket to be created in an IT service management (ITSM) system, such as a systems available from ServiceNow, Inc., of Santa Clara, Calif.

SPLUNK® IT SERVICE INTELLIGENCE™ provides various visualizations built on its service-centric organization of event data and the KPI values generated and collected. Visualizations can be particularly useful for monitoring or investigating service performance. SPLUNK® IT SERVICE INTELLIGENCE™ provides a service monitoring interface suitable as the home page for ongoing IT service monitoring. The interface is appropriate for settings such as desktop use or for a wall-mounted display in a network operations center (NOC). The interface may prominently display a services health section with tiles for the aggregate KPI's indicating overall health for defined services and a general KPI section with tiles for KPI's related to individual service aspects. These tiles may display KPI information in a variety of ways, such as by being colored and ordered according to factors like the KPI state value. They also can be interactive and navigate to visualizations of more detailed KPI information.

SPLUNK® IT SERVICE INTELLIGENCE™ provides a service-monitoring dashboard visualization based on a user-defined template. The template can include user-selectable widgets of varying types and styles to display KPI information. The content and the appearance of widgets can respond dynamically to changing KPI information. The KPI widgets can appear in conjunction with a background image, user drawing objects, or other visual elements, that depict the IT operations environment, for example. The KPI widgets or other GUI elements can be interactive so as to provide navigation to visualizations of more detailed KPI information.

SPLUNK® IT SERVICE INTELLIGENCE™ provides a visualization showing detailed time-series information for multiple KPI's in parallel graph lanes. The length of each lane can correspond to a uniform time range, while the width of each lane may be automatically adjusted to fit the displayed KPI data. Data within each lane may be displayed in a user selectable style, such as a line, area, or bar chart. During operation a user may select a position in the time range of the graph lanes to activate lane inspection at that point in time. Lane inspection may display an indicator for the selected time across the graph lanes and display the KPI value associated with that point in time for each of the graph lanes. The visualization may also provide navigation to an interface for defining a correlation search, using information from the visualization to pre-populate the definition.

SPLUNK® IT SERVICE INTELLIGENCE™ provides a visualization for incident review showing detailed information for notable events. The incident review visualization may also show summary information for the notable events over a time frame, such as an indication of the number of notable events at each of a number of severity levels. The severity level display may be presented as a rainbow chart with the warmest color associated with the highest severity classification. The incident review visualization may also show summary information for the notable events over a time frame, such as the number of notable events occurring within segments of the time frame. The incident review visualization may display a list of notable events within the time frame ordered by any number of factors, such as time or severity. The selection of a particular notable event from the list may display detailed information about that notable event, including an identification of the correlation search that generated the notable event.

SPLUNK® IT SERVICE INTELLIGENCE™ provides pre-specified schemas for extracting relevant values from the different types of service-related event data. It also enables a user to define such schemas.

3.0 Data Availability Validation

Figure 11:
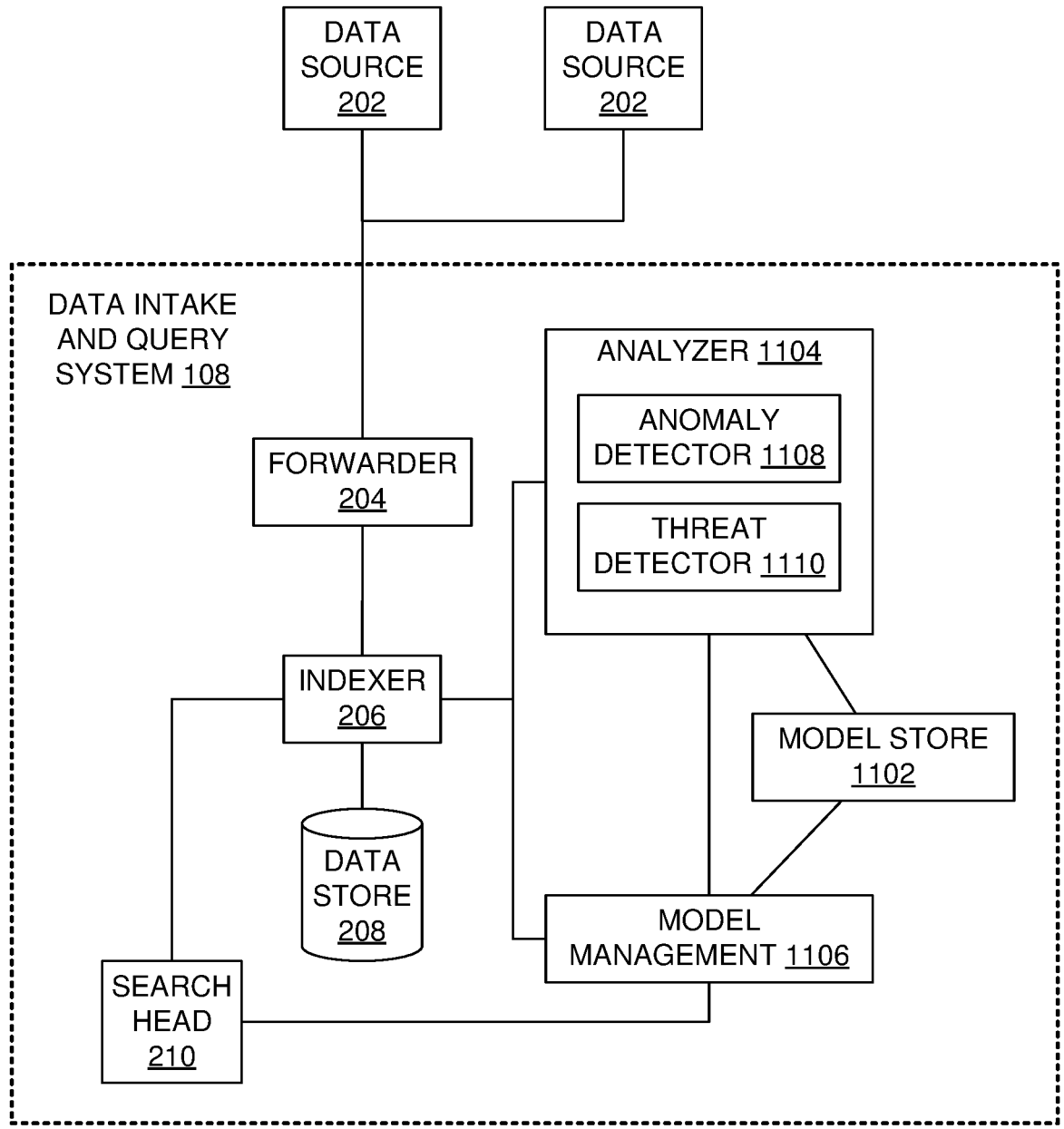
FIG. 11 illustrates a block diagram of an example data intake and query system in which an embodiment may be implemented.

As discussed above, data availability validation ensures that the data relied on by behavior models exists. FIG. 11 illustrates a block diagram of an example data intake and query system in which an embodiment may be implemented. In FIG. 11, the data sources 202, data intake and query system 108, forwarder 204, indexer 206, data store 208, and search head 210 may be the same or similar to the like named components shown in FIG. 2. Further, although fewer instances of the components are shown, any number of instances may exist. For example, the data sources may be in the hundreds or thousands. Similarly, the number of forwarders, indexers, and data stores may similarly scale.

As shown in FIG. 11, the data intake and query system further include a model store 1102, an analyzer 1104, and a model management 1106. The data intake and query system 108 may correspond to a server group having multiple servers. Each server may, for example, correspond to hardware. Thus, the forwarder 204, indexer 206, data store 208, search head 210, model store 1102, analyzer 1104, and model management 1106 may each be a server.

The model store 1102 is any type of data store that includes functionality to store behavior models. For example, the model store 1102 may be a database, one or more storage devices, memory, file system, or other storage that is configured to store behavior models. Each behavior model may have a corresponding unique identifier of the behavior model in the model store. A behavior model defines an expected behavior of the entity being modeled. In the case of network security, the behavior model models the behavior of one or more portions of the network. The behavior model may be a set of rules. Further, the behavior model may include states, and may be time dependent and device dependent. For example, a behavior model may be a machine learning model as described in U.S. Pat. No. 9,591,101.

By way of a more specific example, a behavior model may exist that identifies, for various time periods, ranges of data values that are consistent with expected values. In the example, the behavior model may further correlate data from different data sources. In other words, the expected range of one data value from one data source may be dependent on the expected range of another data value from a different data source. By way of another example, the data model may have an expected sequence of network actions, referred to as "events" in U.S. Pat. No. 9,591,101.

Behavior models may be trained and, in some implementations, continually updated after their activation, by relevant network actions when the raw event data is received. An example of a relevant network action is an authentication action.

Different types of behavior models may exist. For example, a behavior model may be a security model, such as an anomaly model or a threat model. An anomaly model is used to detect anomalies. When satisfied, the output of an anomaly model is an existence of an anomaly. In this description, an "anomaly" is a detected variation from an expected pattern of behavior on the part of an entity. In security, an anomaly may or may not be indicative of a threat. An anomaly represents an action of possible concern, which may be actionable or warrant further investigation. An anomaly is an observable or detectable fact, or data representing such fact. Different anomaly models may output the same type of anomaly ("anomaly type"). For example, a different anomaly model may exist for each different user or group of users ("user group"). In such an example, each of the different anomaly models defined for a specific user or user group may trigger the same type of anomaly. Each anomaly type may have a corresponding unique identifier of the anomaly type. Similarly, each anomaly (i.e., instance of an anomaly type) may have a corresponding unique identifier.

A threat model is a behavior model that is used to detect threats. In particular, a threat model may identify one or more anomalies and other data values that are consistent with a threat. Thus, a threat model may not only identify data values or ranges of data values as with anomaly models, but also anomaly types. When triggered and satisfied, the output of the threat model is the existence of a threat. In particular, an anomaly or a set of anomalies may be evaluated together and may result in a determination of a threat indicator or a threat. A "threat" is an interpretation of one or more anomalies and/or threat indicators. Threat indicators and threats are escalations of actions of concern. Each threat type may have a corresponding unique identifier of the threat type. Similarly, each threat (i.e., instance of a threat type) may have a corresponding unique identifier.

As an example of scale, hundreds of millions of packets of incoming data from various data sources may be analyzed to yield 100 anomalies, which may be further analyzed to yield 10 threat indicators, which may again be further analyzed to yield one or two threats. This manner of data scaling is one of the reasons the security platform can provide anomaly and threat detection in a real-time manner.

Continuing with behavior models, each behavior model may directly or indirectly have corresponding data constraints. Each data constraint may have a unique identifier of the data constraint. The data constraints may be referenced in metadata of the behavior model or interpreted from the behavior model. Data constraints are information describing the data elements directly or indirectly used by the behavior model and a corresponding set of requirements for the data in order to ensure data availability. In other words, each data constraint may identify a data element and an availability requirement set. A data element is a portion of matching entry used by the behavior model. The one or more data element identifiers may include identifiers of the portion and criteria for matching events, such as identifiers of data source types, identifiers of particular data sources, time periods of matching events, and other criteria. For example, a data element may be a field of matching events that may be extracted using extraction rules as described above in Section 1.0 of the description.

The availability requirement set are validation requirements that differentiate between the data in the data constraint being deemed available and the data in the data constraint being deemed unavailable. The availability requirement set may include a number of events that are required to have the corresponding data, a length of time in which the number of events occur, frequency of the events, time periods of the events, and/or other requirements or a combination thereof. The availability requirement set may be a default set for the behavior model or identified in the behavior model or metadata of the behavior model.

Behavior models may further have corresponding dependency information. The dependency information identifies the components on which a behavior model depends. The components on which the behavior model depends may include particular anomaly types, anomaly models, data constraints, other components, or any combination thereof. Dependency information may be included in the metadata of the behavior model and/or extrapolated from the behavior model. The dependency information may be stored in the model store or a separate repository. For example, the dependency information may include the unique identifier of the behavior model and unique identifiers of the components on which the behavior model depends.

Continuing with FIG. 11, an analyzer 1104 is connected to the model store 1102 and the indexer 206. The analyzer 1104 may be hardware, software, or firmware, or any combination thereof that includes functionality to process event data through the behavior models to generate conclusions (e.g., anomalies, threat indicators, threats, or any combination thereof). The analyzer 1104 may operate in real-time. "Real-time" computing, or "reactive computing", describes computer systems subject to a processing responsiveness restriction (e.g., in a service level objective (SLO) in a service level agreement (SLA)). In real-time processing, conclusions are reached substantially immediately following the receipt of input data such that the conclusions can be used to respond to the observed environment. The analyzer 1104 continuously receives new incoming raw event data from the indexer 206 and reacts to each new incoming event by processing the event through the anomaly detector and the threat detector. Because of real-time processing, the analyzer 1104 can begin to process a time slice of the unbounded stream prior to when a subsequent time slice from the unbounded stream becomes available. The analyzer 1104 may further analyze historical data. In such a scenario, the analyzer 1104 may use event data obtained from queries submitted to the search head 210.

As shown in FIG. 11, the analyzer 1104 includes an anomaly detector 1108 and a threat detector 1110. The anomaly detector 1108 includes functionality to detect anomalies from the raw event data using behavior models. The threat detector 1110 includes functionality to detect threats based on detected anomalies. The anomaly detector may further include functionality to generate behavior models.

Model management 1106 is connected to the analyzer 1104 and the model store 1102. The model management 1106 is hardware, software, firmware or any combination thereof that includes functionality to manage behavior models. All or part of the model management 1106 may be part of the analyzer 1104 or separate from the analyzer 1104. The model management 1106 may include functionality to perform data availability validation for behavior models in one or more embodiments. For example, the model management 1106 may include functionality to obtain and manage dependency information and store data constraints. The model management 1106 may be configured to operate in an online mode and an offline mode. In the online mode, the model management 1106 is configured to receive events and update tallies corresponding to data constraints based on the events. Thus, the model management 1106 may operate in real-time as described above to perform data availability validation. In the offline mode, the model management 1106 may include functionality to send queries to the search head and receive information from the search head. The model management 1106 may use the information to perform data availability validation.

The model management 1106 may further include a graphical user interface. The graphical user interface may be configured to display a data availability dashboard. In one or more embodiments, the display availability dashboard includes multiple panes. A first pane may relate a behavior model identifier of a behavior model with an identifier of whether the data constraints of the behavior model are satisfied, partially satisfied, or not satisfied. A second pane may show dependency information for a behavior model. The second pane may further show which data constraints are not satisfied.

Figure 12:
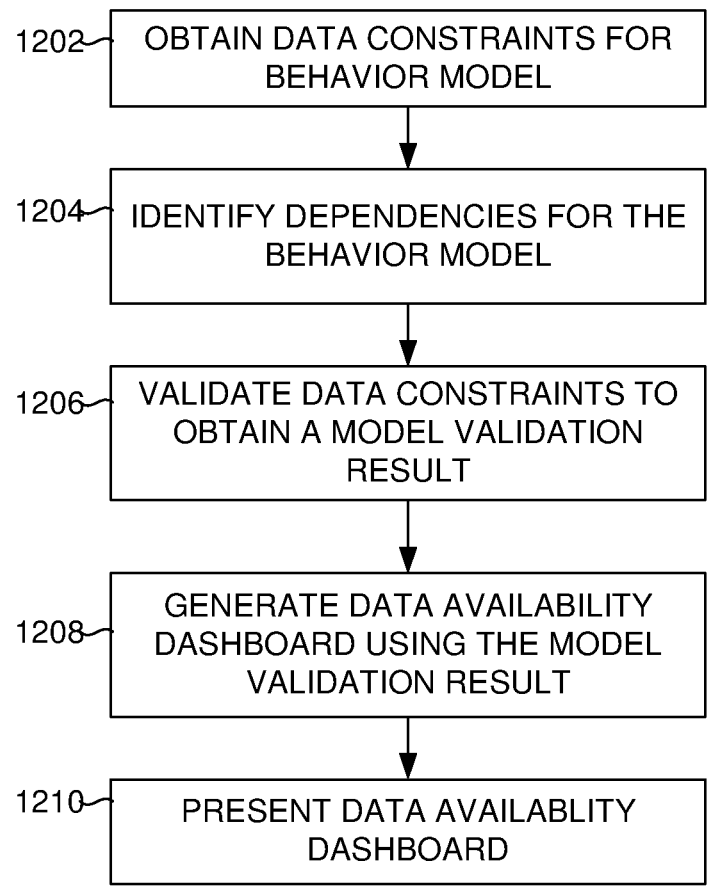
FIG. 12 is a flow diagram that illustrates how data availability validation may be performed in accordance with the disclosed embodiments.
Figure 13A:
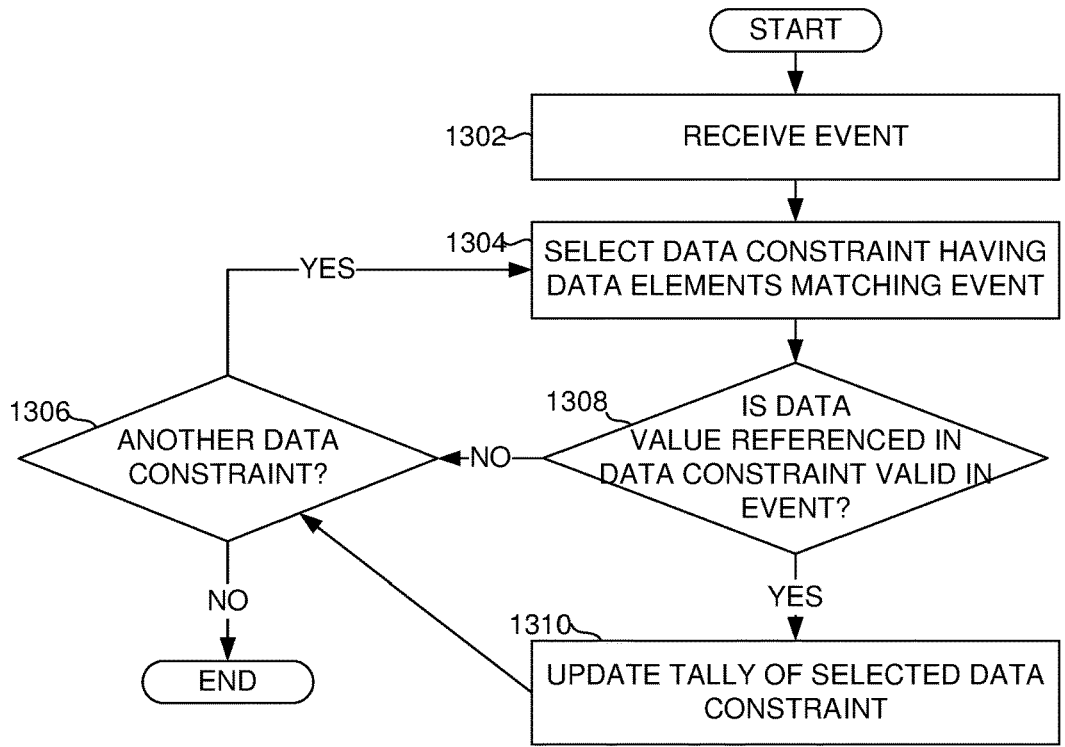
FIGS. 13A and 13B show flow diagrams that illustrates validating data constraints in real time in accordance with disclosed embodiments.
Figure 13B:
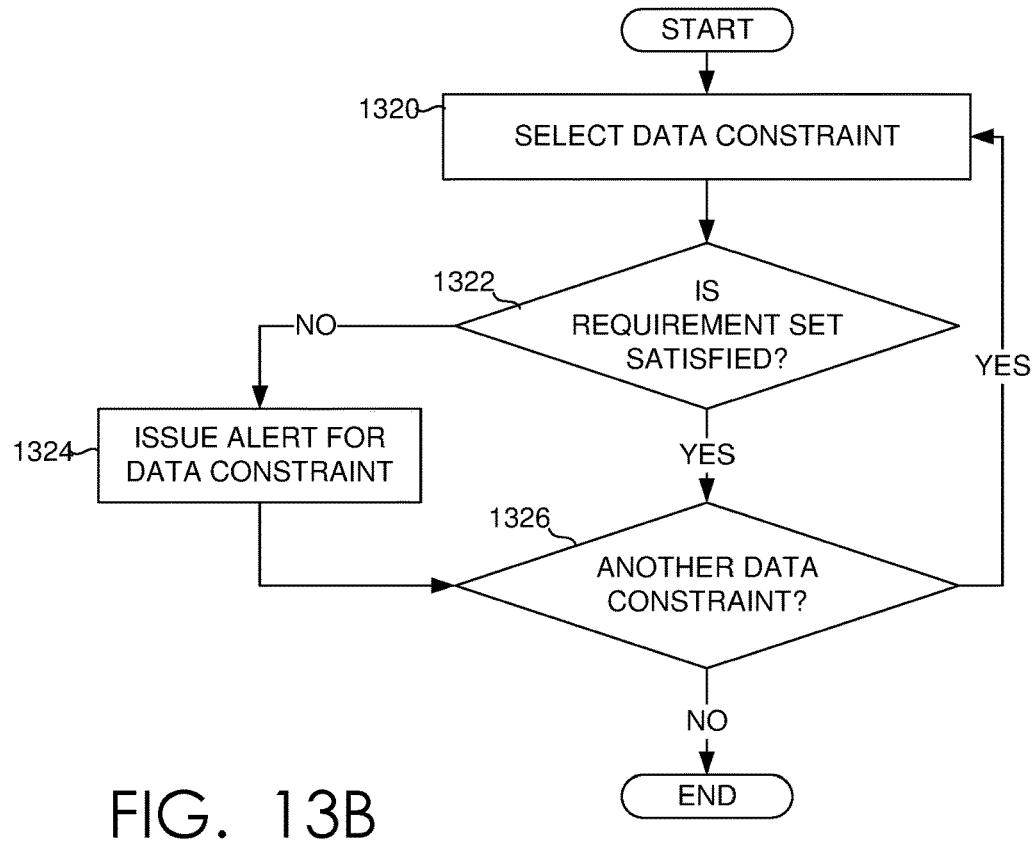
Figure 14:
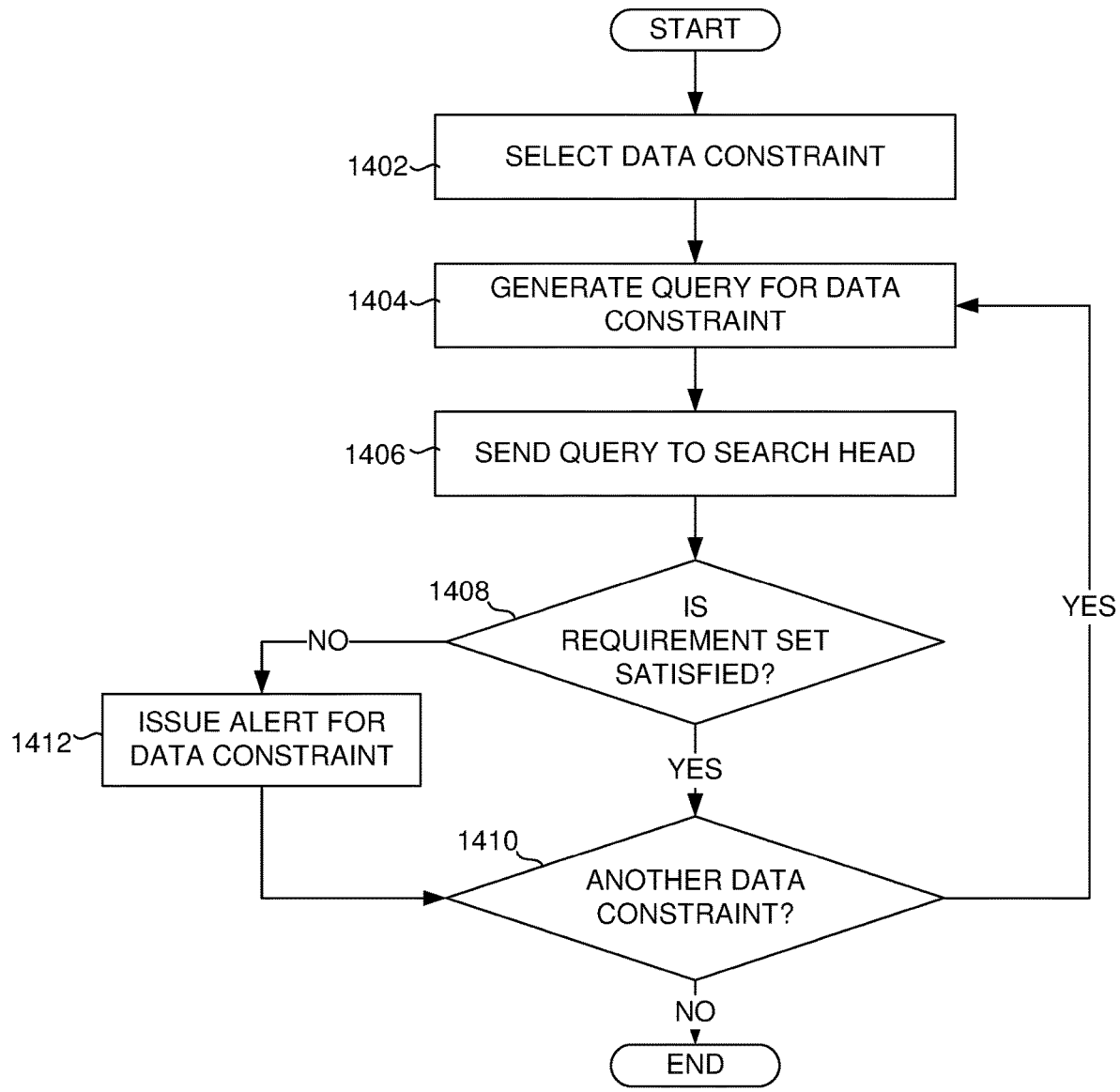
FIG. 14 shows a flow diagram that illustrates validating data constraints using queries in accordance with disclosed embodiments.

FIGS. 12-14 show flow diagrams in accordance with disclosed embodiments. While the various steps in these diagrams are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the disclosure. By way of an example, determination steps may not require a processor to process an instruction unless an interrupt is received to signify that condition exists in accordance with one or more embodiments of the disclosure. As another example, determination steps may be performed by performing a test, such as checking a data value to test whether the value is consistent with the tested condition in accordance with one or more embodiments of the disclosure.

FIG. 12 is a flow diagram that illustrates how data availability validation may be performed in accordance with the disclosed embodiments. For example purposes only, the behavior model may be a hundred or several hundred or more, and each behavior model may rely on a large number of data elements.

A network connection between a server group of a data intake and query system and each of one or more source network nodes is established. The data intake and query system connects via the network to the various data sources. Some of the various data sources may be on the same physical device and other data sources may be on different physical devices. Source data is received source data at the server group from at least one of the source network nodes via the network connections. The source data may be transformed by the indexer server to timestamped entries of machine data in one or more embodiments. For example, the timestamped entries may be events or aggregated data associated with a timestamp.

Continuing with FIG. 12, the flow of FIG. 12 may be performed for each behavior model. At block 1202, data constraints for a behavior model are obtained. The data constraints are detected by the model management in accordance with one or more embodiments. Specifically, as discussed above, data constraints may be obtained from metadata of the behavior model or extrapolated from the behavior model. In one or more embodiments, the data constraints are extracted from metadata about the behavior model. For example, the metadata may include one or more data constraint identifiers. As another example, the metadata may alternatively or additionally list inputs to the behavior model. The inputs may be one or more data element identifiers and/or one or more anomaly type identifiers. Inputs to the behavior model may be extrapolated from the behavior model. In particular, the rules or instructions of the behavior model may be parsed and analyzed to detect inputs to the behavior model.

If the behavior model or metadata of the behavior model does not include the availability requirement set for data elements, default availability requirement set may be used and associated with the data elements to obtain the data constraints. Alternatively, the behavior model or metadata of the behavior model may have the data constraint with the availability requirement set.

If the behavior model or metadata of the behavior model includes identifiers of individual data sources, the one or more data sources that output events matching the criteria are identified. An individual data constraint may be obtained for each of the one or more identified data sources. For example, consider the scenario in which the criteria for an event is a data source type of a "firewall application" and the data field is "packets blocked." In the example scenario, an individual data constraint is identified for each firewall application in the network. Each individual data constraint includes "packets blocked," an identifier of the firewall application (e.g., data source identifier), and availability requirement set.

By way of another example, consider the scenario in which the criteria for an event is a data source type of a "firewall application" that is on an edge device, and the data field is "packets blocked." In the example scenario, an individual data constraint is identified for a subset of firewall applications executing on edge devices in the network. Each individual data constraint includes "packets blocked," an identifier of the firewall application (e.g., data source identifier), and availability requirement set.

To identify matching data sources, the configuration of the network may be accessed. By way of another example, the network may be crawled to identify matching data sources.

Continuing with FIG. 12, at block 1204, the dependencies for the behavior model are identified. Multiple behavior models may have the same data constraints. By linking the multiple behavior models to the same data constraint in storage, redundant checking to determine whether the data constraint is satisfied may be avoided. Thus, for each data constraint determined in Block 1202, a determination is made whether the data constraint is already stored. If not already stored, then a new data constraint is saved in storage. Thus, the data constraint may be tracked. Once stored, a dependency relationship, such as a reference or link, between the behavior model identifier of the behavior model and the data constraint identifier of the data constraint is stored.

Similarly, dependency relationships may be stored between behavior models. For example, if the inputs to a behavior model include one or more anomaly type identifiers, then the model management may identify which anomaly models trigger anomalies matching the one or more anomaly type identifiers. Namely, the model management identifies the output of each anomaly model and selects the anomaly models that trigger anomalies matching the anomaly type identifier. For each identified anomaly model, a dependency relationship, such as a reference or link, between the behavior model identifier of the behavior model and the one or more anomaly model identifiers of the identified anomaly models is stored. Other dependency relationships may be created based on dependencies of the behavior models.

At block 1206, data constraints are validated to obtain a validation result. In particular, each data constraint is processed to determine whether the data constraint is satisfied. In other words, a determination is made whether event data matching the event is received within the specified time period. The additional set of requirements for the data constraint is further examined. Data constraints may be validated as event data is received, such as in real time. Validating data constraints in real time may be performed as described in FIGS. 13A and 13B. Data constraints may alternatively be validated using query data in an offline mode. Validating data constraints using query data may be performed as described in FIG. 14.

From the validation results of the data constraints, a data availability assessment is determined for the behavior models. For any data constraint that is not satisfied as indicated in the validation results, dependency information may be used to identify corresponding behavior models that are directly or indirectly dependent on the data constraint. The corresponding behavior models may be identified in the data availability assessment. The data availability assessment may be stored in computer storage. For example, the data availability assessment may be stored in hardware storage in the model store, the analyzer and/or the model management.

An alert may be generated for the identified corresponding behavior models. The alert may be transmitted to a user. Transmitting the alert may be in a graphical user interface, as an electronic message (e.g., email or text message), popup notification, or other medium of transmission. Thus, a user is able to receive, in real-time, notice if a problem exists with the data. In a security setting, the alert notifies the user of a potential vulnerability in the network system in real-time. In other words, if the user uses behavior models for intrusion detection, determining exfiltration, or other nefarious acts, the use of the alert notifies the user that the security system is unable to perform the detection. Thus, the system distinguishes between a case in which an anomaly or threat does not exist, and that insufficient data exists to detect the anomaly or threat.

At block 1208, a data availability dashboard is generated. Generating the data availability dashboard may be performed by iterating through behavior models and using the data availability assessment. For each behavior model, dependencies of the behavior model are identified using the dependency information. A GUI reference, such as a line or other GUI linkage, is added between the behavior models and the dependencies. Further, an alert indicator may be shown with each data constraint that is not satisfied in the data validation result. The alert may also be propagated to each behavior model that directly or indirectly depends on the data constraint as reflected in the data availability assessment.

Additionally, in the dashboard, behavior models may be shown in groups that may be expanded or collapsed. The groups may be created based on shared attributes of the behavior model.

At block 1210, the data availability dashboard is presented. The data availability dashboard may be displayed on a display device used by the user. As another example, the data availability dashboard may be transmitted to a computing device of the user.

FIGS. 13A and 13B show flow diagrams that illustrate validating data constraints in real time in accordance with disclosed embodiments. FIG. 13A shows a flow diagram for updating a tally as events are received. FIG. 13B shows a flow diagram for determining whether data constraints are satisfied. FIGS. 13A and 13B may be performed by the same or different threads of execution. For example, threads of execution may perform the operations of FIG. 13A on a data constraint to update the data constraint and then validate the same data constraint by performing at least some of the operations of FIG. 13B. By way of another example, dedicated threads may perform the operations of FIG. 13A and separate dedicated threads may perform the operations of FIG. 13B.

Although FIG. 13A describes the flow when a single event is received, a large number of events may be concurrently received by the security system. In particular, the number of data sources may be in the thousands, and each data source provides raw machine data streams to the data intake and query system. For example, a single customer of the data intake and query system may have five hundred thousand data sources. The data sources may cause approximately fifty thousand events per second. Larger customers of the data intake and query system may have as many as one hundred and fifty thousand events per second. Even with fifty thousand events a second, one million events are processed every twenty seconds, three million a minute, one hundred and eighty million an hour, and more than four billion events a day. The above are only examples of the magnitude of events processed by the model management and analyzer. Thus, the analyzer and model management handle high-volume digital data streams. Further, the techniques described in FIGS. 13A and 13B provide for the high-volume data streams to be processed in real-time.

Starting with FIG. 13A, at block 1302, an event is received. In one or more embodiments, the data intake and query system performs the processing of FIG. 3 when receiving each data stream from the variety of data sources. For example, the forwarder may receive data from a data source, perform the processing of the forwarder, and transmit the data to the indexer. The indexer may parse the data into events and perform one or more of the blocks described in reference to Section 2.5.2 of the description. The indexer sends the event to the analyzer and the model management. The analyzer may execute behavior models using the event to determine whether the behavior models are satisfied to trigger an output.

The model management receives the event. At block 1304 of FIG. 13A, the model management selects a data constraint having data elements matching event. In one or more embodiments, the model management may iterate through the data constraints. Iterating may include checking each data constraint. Alternatively, data constraints may be grouped hierarchically. In other words, data constraints having similar data elements may be in the same group while data constraints having dissimilar data elements are in different groups. By way of a more specific example, data constraints may be grouped based on data source type. In such a scenario, only the portion of the hierarchy matching the event is traversed. The flow may proceed with Block 1308 to process each data constraint.

In Block 1308, a determination is made whether the data value in the event that is referenced in the data constraint is valid. For example, one or more extraction rules may be applied to the event to obtain the data value from the corresponding field in the event that is referenced by the data constraint. A determination is made whether the data value is valid data. A data value may be determined valid if the data value is not null or is an expected data type. A data value may be determined valid if the data value is within a predefined range of valid data values. If the data value is not valid, the flow may proceed to block 1308.

If the data value is valid, a tally of the selected data constraint is updated at block 1310. In one or more embodiments, the tally is incremented by one. If the availability requirement set includes temporal requirements (e.g., that Y events satisfying the data constraint are received within the previous X amount of time), the tally may be updated by appending the timestamp of the event to a previous tally. Other methods for managing temporal data constraints may be used. Once the tally is updated, the flow may proceed to block 1306.

At block 1306, a determination is made whether another data constraint exists. In other words, the next data constraint is selected and processed. If another data constraint exists, then the next data constraint is processed.

The flow of FIG. 13A may be performed each time an event is received. Further, multiple threads may process events to update tallies of satisfied data constraints.

FIG. 13B shows a flow diagram that illustrates checking data constraints to determine whether the availability requirement set is satisfied. The blocks of FIG. 13B may be continually performed to generate real-time alerts. As another example, the blocks of FIG. 13B may be performed when a user requests the display of the data availability dashboard.

At block 1320, a data constraint is selected. In one or more embodiments, the model management iterates through the data constraints. The model management selects a data constraint to check. Data constraints may be checked in serial or in parallel.

At block 1322, the model management determines whether the availability requirement set for the data constraint is satisfied. In one or more embodiments, the model management obtains the tally for the data constraint and determines whether the tally satisfies the availability requirement set for the data constraint. For example, the model management may compare the number of events identified in the tally with the number of events required by the availability requirement set. If the number of events in the tally is greater than or equal to the number of events specified by the availability requirement set, then the availability requirement set is deemed satisfied. If the availability requirement set has a temporal element, the model management may aggregate information in the tally to determine whether the availability requirement set is satisfied. If the availability requirement set is not satisfied, an alert is issued for the data constraint. In particular, the data constraint is associated with an alert. The alert may be stored in the model result set. The alert may be propagated to the behavior models directly or indirectly dependent on the data constraint using dependency information. Further, the alert may be transmitted to the user.

In one or more embodiments, regardless of whether the availability requirement set is satisfied, the flow may proceed to block 1326. At block 1326, a determination is made whether another data constraint exists that is not yet processed. If another data constraint exists, the flow returns to block 1320 to select and process the next data constraint.

The results of the validation may be in the validation results. The validation results may indicate the data constraints that are not satisfied, and the behavior models in which one or more of the data constraints are not satisfied. The validation results may identify the satisfied data constraints.

FIG. 14 shows a flow diagram that illustrates validating data constraints using queries in accordance with disclosed embodiments. At block 1402, a data constraint is selected. One or more embodiments may iterate through the data constraints as described above with reference to FIG. 13B.

At block 1404, a query is generated for the data constraint in accordance with one or more embodiments. The query may be generated in a pipeline search language. The query may include a search of the data store for the number of events having a valid data value that matches the data element in the data constraint. The search may further include the temporal constraint in the availability requirement set. The search head or the model manager may further be provided with information about the availability requirement set. For example, the second element of the pipeline may be information about the availability requirement set.

At block 1406, the query is transmitted to the search head. The search head processes the query as described above in reference to FIG. 4 to obtain search results and produce a final result as described in FIG. 4. The final result may be whether the availability requirement set is satisfied. By way of another example, the final result may be information about the data elements in the data constraint. For example, the final results may be the number of events matching the data constraint.

Continuing with FIG. 14, at block 1408, a determination is made whether the availability requirement set is satisfied. If the availability requirement set is not satisfied, the flow proceeds to block 1412 to issue an alert for the data constraint. Regardless of whether the availability requirement set is satisfied, the flow may proceed to block 1410. At block 1410, a determination is made whether another data constraint exists. Blocks 1408, 1412, and 1410 may be performed in the same or similar manner as blocks 1322, 1324, and 1326 of FIG. 13.

Figure 15:
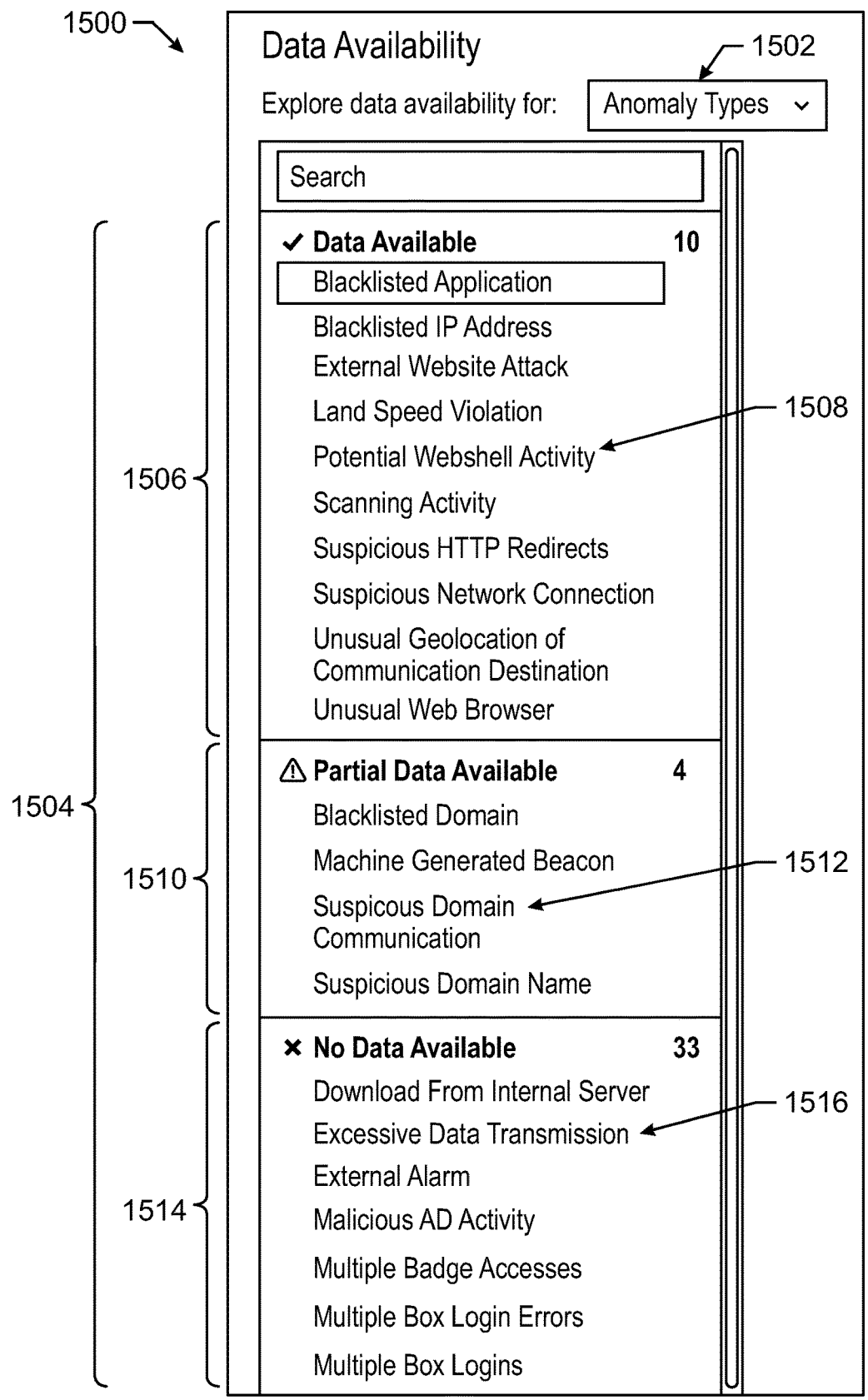
FIG. 15 is an example portion of a graphical user interface diagram in accordance with disclosed embodiments.

FIG. 15 is an example portion of a graphical user interface (GUI) diagram in accordance with disclosed embodiments. FIG. 15 shows a pane (1500) of the data availability dashboard in accordance with one or more embodiments. The GUI shown in FIG. 15 may be displayed on a display device of the user. As shown in FIG. 15, the pane allows the user to explore the data availability. The user may select, using GUI widget 1502, to explore based on type of behavior model or data constraint. In the example, the user selected to explore anomaly models grouped on anomaly type.

As shown in FIG. 15, the anomaly types are grouped in availability groups 1504. The number next to each data availability group identifier identifies the number of anomaly types in the group. In the data available group 1506, the anomaly types having all data available is listed. In other words, all anomaly models that issue anomalies of the anomaly type have all data constraints satisfied when the anomaly type is in the data available group 1506. Thus, for example, anomaly models that issue anomalies of potential webshell activity anomaly type 1508 each have all data available.

In partial data available group 1510, the anomaly types having some data available is listed. When the anomaly type is in the partial data available group 1510, at least some anomaly models that issue anomalies of the anomaly type have some data constraints satisfied, and some anomaly models do not have all data constraints satisfied. Thus, the partial data available group identifies anomaly types that may or may not be correctly detected with the data available. By way of an example, the suspicious domain communication anomaly type 1512 being in the partial data available group 1510 indicates a possibility that only some of the suspicious domain communications may be correctly detected.

In the no data available group 1514, the anomaly types having no data available is listed. In other words, no anomaly models that issue anomalies of the anomaly type have all data constraints satisfied when the anomaly type is in the data available group 1514. The no data available group indicates that anomalies of the anomaly types are not detectable. Thus, in the example, excessive data transmission anomalies are undetectable as shown by the excessive data transmission anomaly type 1516 being in the no data available group 1514.

Figure 16:
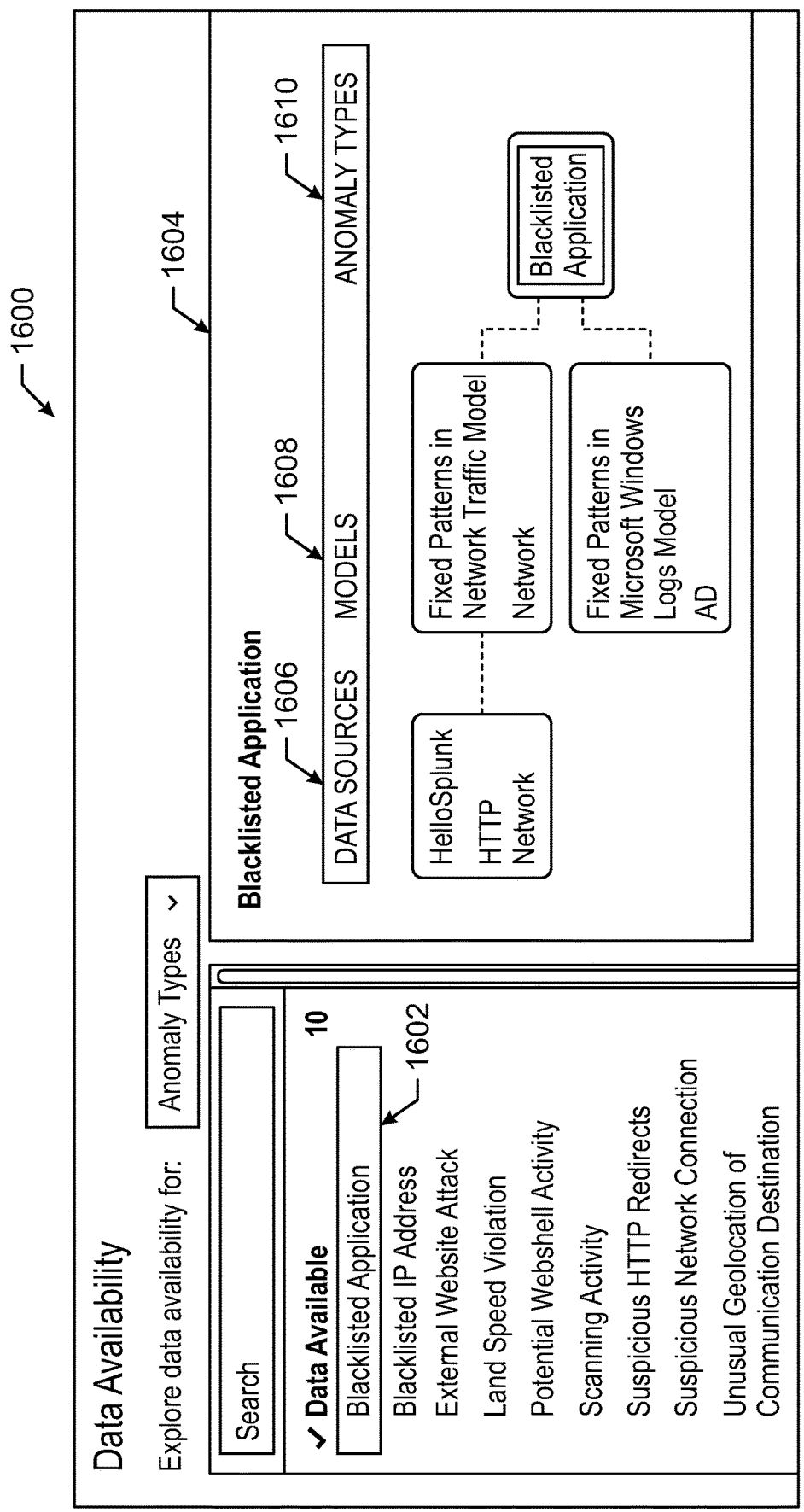
FIG. 16 is an example portion of a graphical user interface diagram in accordance with disclosed embodiments.

FIG. 16 is an example portion of a GUI diagram in accordance with disclosed embodiments. FIG. 16 shows a portion of the data availability dashboard 1600. The left pane of the data availability dashboard matches the left pane shown in FIG. 15. In the example shown in FIG. 16, a user selects the blacklisted application anomaly type 1602 in the left pane. The right pane 1604 shows a dependency diagram for the blacklisted application anomaly type.

In particular, the dependency diagram relates data sources 1606 to the anomaly models 1608 issuing the blacklisted application anomaly type with the blacklisted application anomaly type 1610. Lines link the various elements to show the dependencies. Thus, a user may explore dependencies for an anomaly type.

Figure 17:
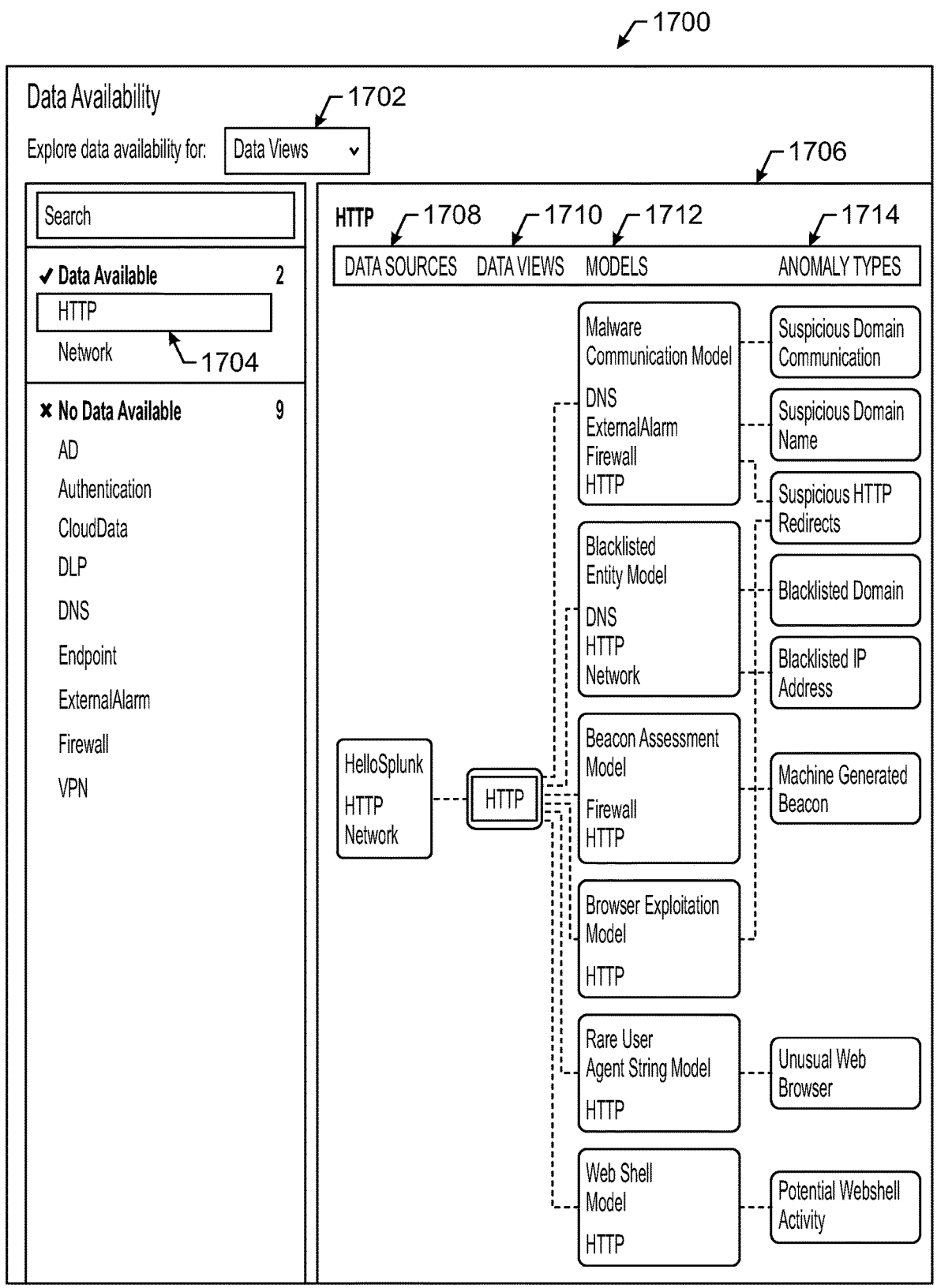
FIG. 17 is an example portion of a graphical user interface diagram in accordance with disclosed embodiments.

FIG. 17 is an example portion of a graphical user interface diagram in accordance with disclosed embodiments. FIG. 17 shows a portion of the data availability dashboard 1700. In the example shown, the user selects to explore data according to data views using GUI widget 1702. The data view is the grouping of data by categories of data. For example, the data view in FIG. 17, groups data by categories of data. Thus, hypertext transport protocol (HTTP), network, AD, authentication, etc. are different categories of data. Data constraints may be grouped in the category. Further, the categories of data may be grouped into data availability grouping in a same or similar manner to FIG. 15. In other words, the left pane of the data availability dashboard is similar to the left pane shown in FIG. 15. In the example shown in FIG. 17, a user selects the HTTP data view 1704 in the left pane.

The right pane 1706 shows a dependency diagram for the HTTP data view 1704. In particular, the right pane 1706 shows a dependency between data sources 1708, data views 1710, behavior models 1712, and anomaly types 1714. Displayed lines show linkages between the models. Thus, a user may explore dependencies based on categories of data.

Figure 18:
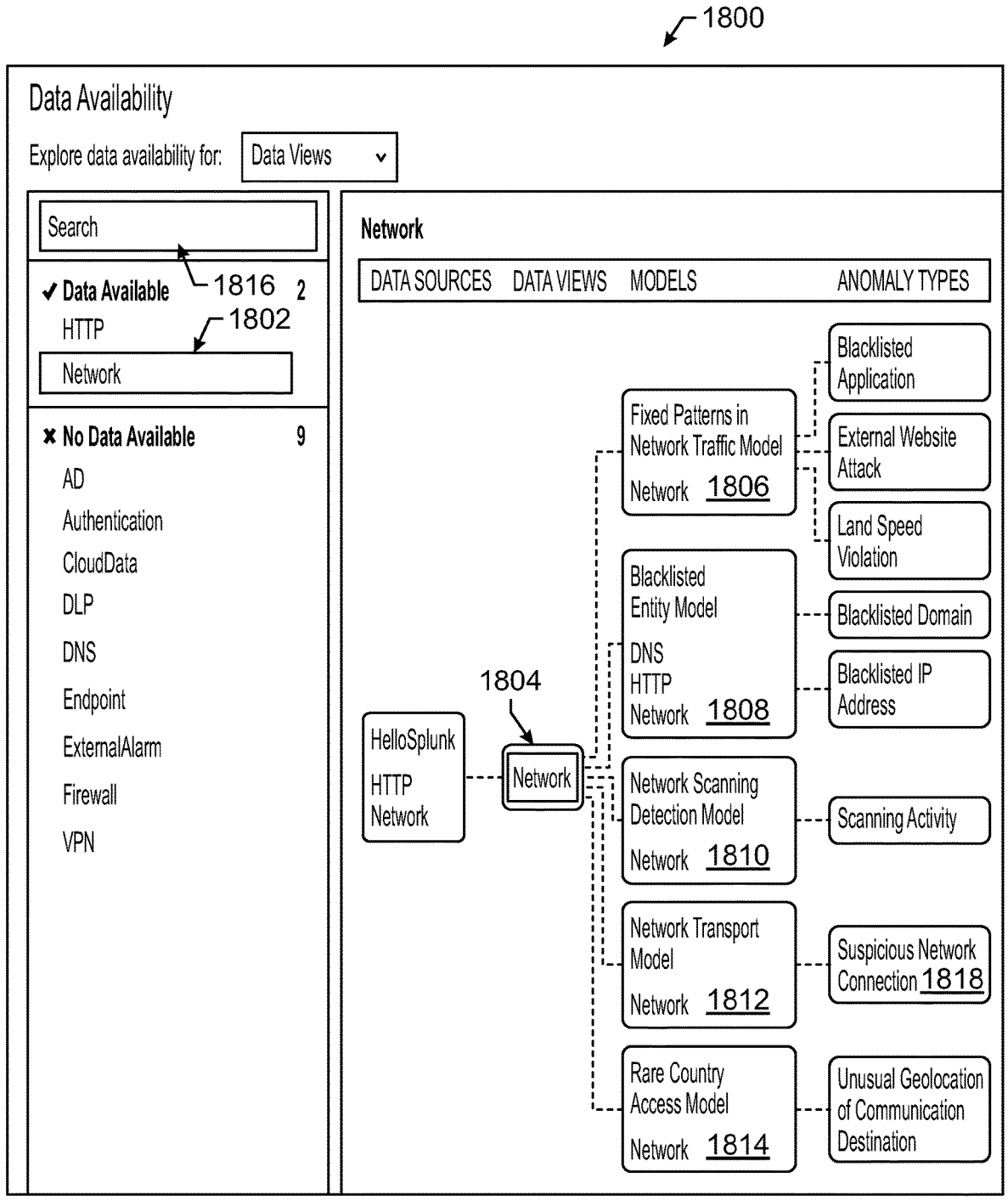
FIG. 18 is an example portion of a graphical user interface diagram in accordance with disclosed embodiments.

FIG. 18 is an example portion of a graphical user interface diagram in accordance with disclosed embodiments. In particular, FIG. 18 shows the data availability dashboard 1800 when a user selects to explore data based on the network data view 1802. As shown in the example, a variety of anomaly models for managing a network are part of the network data view as shown by the lines in FIG. 18 between the anomaly models and the network box 1804. The anomaly models include a model that analyzes the fixed patterns in network traffic 1806, a blacklisted entities model 1808, network scanning and detection model 1810, a network transport model that analyzes network connections 1812, and a model that triggers an anomaly based on rare countries accessing the network 1814. Some anomaly models belong to more than one data view. For example, the blacklisted entities model 1808 is in the domain name service (DNS), HTTP, and network data views as shown by the text in the box for the blacklisted entity model 1808.

Using the connection lines, the user is able to determine exactly which anomalies are detected by which anomaly models. Next consider the scenario in which the network transport model 1812 does not have all data available. In such a scenario, the network data view would be in the partial data available grouping (not shown) on the left pane 1816. The network box 1804, box for the network transport model 1812, and box for the suspicious network connections 1818 may be in a different color, such as red. Other alerts may be shown. By not being able to detect suspicious network connections, a vulnerability in the network exists. However, because the user is notified, corrective action may be taken to remove the vulnerability of the network.

Figure 19:
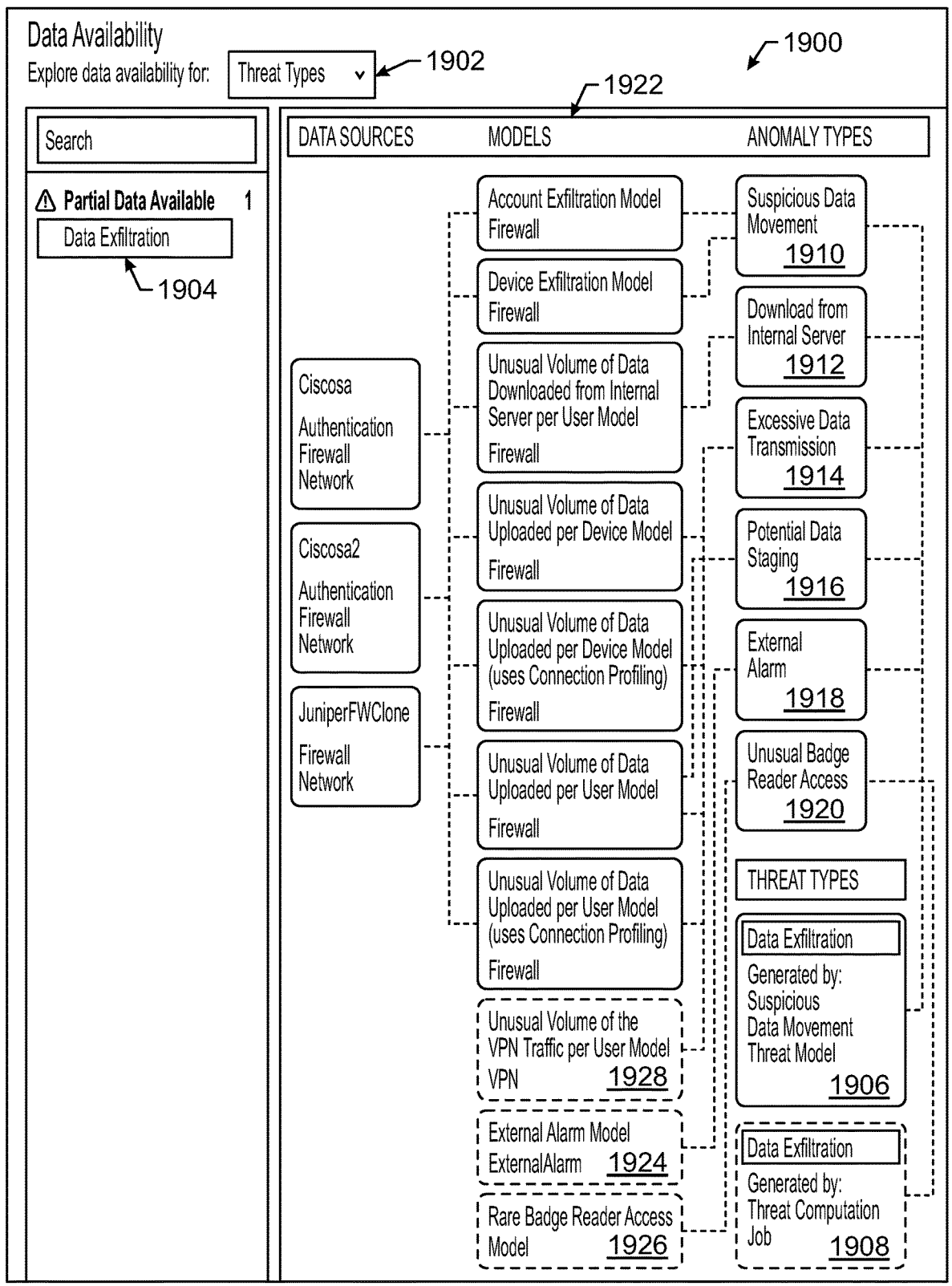
FIG. 19 is an example portion of a graphical user interface diagram in accordance with disclosed embodiments.

FIG. 19 is an example portion of a graphical user interface diagram in accordance with disclosed embodiments. In particular, FIG. 18 shows the data availability dashboard 1900 when a user selects to explore data based on the threat type 1902. Further, the user has selected, from the partial data available group, data exfiltration threat 1904. Data exfiltration is the unauthorized transfer of data from a computer. Data exfiltration is a severe security threat in that a large company may lose confidential and/or proprietary data. Data exfiltration may be performed by a nefarious employee with physical access to a computer or through a malicious program via a network. In the example of FIG. 19, two data exfiltration threat models exist 1906, 1908. The first data exfiltration threat model 1906 uses anomaly types: suspicious data movement, download from internal server 1910, excessive data transmission 1912, potential data staging 1914, and external alarm 1916. The second data exfiltration threat model uses the unusual badge reader access anomaly type 1918. In other words, the detection of the various anomaly types is used by the corresponding data exfiltration threat models 1906, 1908 to detect the data exfiltration threat. As shown in the lines between the anomaly models in anomaly model column 1920 and the anomaly types, anomaly models may generate different anomaly types. Further, the same anomaly type may be generated by multiple anomaly models.

Similarly, as shown in the data availability dashboard 1900 via the lines, the anomaly models in anomaly model column 1920 may use data from various data sources as shown by the data sources column 1922. Thus, viewing the data availability dashboard 1900, the user is able to identify which data sources provide data to which anomaly models that detect the anomalies that are then used by the threat models.

Moreover, as shown by the different color and the lack of lines to any data source, the external alarm anomaly model 1924, the rare badge reader access anomaly model 1926, and the unusual volume of VPN traffic per user model 1928 cannot detect the corresponding anomalies (i.e., external alarm anomaly 1916 and the unusual badge reader access anomaly 1918). Thus, the two data exfiltration threat models 1906, 1908 may not properly detect the data exfiltration threat. Because of the inability to properly detect certain threats with the data being unavailable, vulnerabilities exist in the user's network. The data availability dashboard 1900 clearly shows to the user the vulnerabilities in the user's network. Because the user's network may have over fifty thousand data sources and over a hundred models, identifying the particular models that have insufficient data and identifying data sources that are non-existent or misconfigured would be a challenge to the user without one or more embodiments described herein. However, using the data availability dashboard 1900, the user may then create corrective action to ensure that badge readers and other data sources provide the required data to the data intake and query system to remove the vulnerability. Thus, the user's network may be secured from data exfiltration threats.

4.0 Hardware

The various components of the figures may be a computing system or implemented on a computing system. For example, the operations of the data stores, indexers, search heads, host device(s), client devices, data intake and query systems, data sources, external resources, and/or any other component shown and/or described above may be performed by a computing system. A computing system may include any combination of mobile, desktop, server, router, switch, embedded device, or other types of hardware. For example, the computing system may include one or more computer processors, non-persistent storage (e.g., volatile memory, such as random access memory (RAM), cache memory), persistent storage (e.g., a hard disk, an optical drive such as a compact disk (CD) drive or digital versatile disk (DVD) drive, a flash memory, etc.), a communication interface (e.g., BLUETOOTH interface, infrared interface, network interface, optical interface, etc.), and numerous other elements and functionalities. The computer processor(s) may be an integrated circuit for processing instructions. For example, the computer processor(s) may be one or more cores or micro-cores of a processor. The computing system may also include one or more input devices, such as a touchscreen, keyboard, mouse, microphone, touchpad, electronic pen, or any other type of input device.

The computing system may be connected to or be a part of a network. For example, the network may include multiple nodes. Each node may correspond to a computing system, such as the computing system, or a group of nodes combined may correspond to the computing system. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system may be located at a remote location and connected to the other elements over a network.

The node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes in the network may be configured to provide services for a client device. For example, the nodes may be part of a cloud computing system. The nodes may include functionality to receive requests from the client device and transmit responses to the client device. The client device may be a computing system. Further, the client device may include and/or perform all or a portion of one or more embodiments of the disclosure.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

While the above figures show various configurations of components, other configurations may be used without departing from the scope of the disclosure. For example, various components may be combined to create a single component. As another example, the functionality performed by a single component may be performed by two or more components.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
   receiving, via a network, a plurality of timestamped data entries from a data source;
   obtaining a plurality of data constraints for a first model, wherein the plurality of data constraints comprises a data element used by the first model and an availability requirement set, wherein the availability requirement set defines when the data element is deemed available based on the plurality of timestamped data entries that have the data element;
   validating, using the plurality of timestamped data entries as input, the plurality of data constraints to obtain a validation result, wherein validating the plurality of data constraints comprises determining whether the plurality of timestamped data entries satisfies the availability requirement set for the data element;
   determining a data availability assessment of the first model based on the validation result; and
   storing, in computer storage, the data availability assessment of the first model.

2. The method of claim 1, wherein validating the plurality of data constraints comprises:
   identifying at least a portion of the plurality of timestamped data entries having the data element, and determining whether the at least the portion satisfies the availability requirement set for the data element.

3. The method of claim 1, further comprising:
for each entry of the plurality of timestamped data entries, updating a tally of the data element when the data element matches the entry; and
detecting a data constraint of the plurality of data constraints as unsatisfied when the tally fails to satisfy the availability requirement set.

4. The method of claim 1, further comprising:
transmitting, by an indexer server, the plurality of timestamped data entries to an analyzer server; and
executing, by an analyzer server, the first model using the plurality of timestamped data entries while the plurality of data constraints is validated.

5. The method of claim 1, further comprising:
identifying a second model as being dependent on the first model; and
presenting an alert for the second model based on the plurality of data constraints of the first model being unsatisfied.

6. The method of claim 1, wherein the availability requirement set defines a number of events matching the data element to satisfy a corresponding data constraint of the plurality of data constraints.

7. The method of claim 1, wherein the availability requirement set comprises a temporal requirement.

8. The method of claim 1, wherein validating the plurality of data constraints further comprises:
verifying that a data value in the plurality of timestamped data entries is valid prior to using the data value to determine whether the availability requirement set is satisfied.

9. The method of claim 1, further comprising:
determining a data availability assessment of a second model based on the validation result, wherein the second model comprises at least a subset of the plurality of data constraints of the first model.

10. A system comprising:
memory; and
one or more processors configured to perform operations comprising:
receiving, via a network, a plurality of timestamped data entries from a data source,
obtaining a plurality of data constraints for a first model, wherein the plurality of data constraints comprises a data element used by the first model and an availability requirement set, wherein the availability requirement set defines when the data element is deemed available based on the plurality of timestamped data entries that have the data element,
validating, using the plurality of timestamped data entries as input, the plurality of data constraints to obtain a validation result, wherein validating the plurality of data constraints comprises determining whether the plurality of timestamped data entries satisfies the availability requirement set for the data element,
determining a data availability assessment of the first model based on the validation result, and
storing, in computer storage, the data availability assessment of the first model.

11. The system of claim 10, wherein validating the plurality of data constraints comprises:
identifying at least a portion of the plurality of timestamped data entries having the data element, and
determining whether the at least the portion satisfies the availability requirement set for the data element.

12. The system of claim 10, the operations further comprising:
for each entry of the plurality of timestamped data entries, updating a tally of the data element when the data element matches the entry; and
detecting a data constraint of the plurality of data constraints as unsatisfied when the tally fails to satisfy the availability requirement set.

13. The system of claim 10, the operations further comprising:
identifying a second model as being dependent on the first model; and
presenting an alert for the second model based on the plurality of data constraints of the first model being unsatisfied.

14. The system of claim 10, wherein the availability requirement set comprises a temporal requirement.

15. The system of claim 10, the operations further comprising:
determining a data availability assessment of a second model based on the validation result, wherein the second model comprises at least a subset of the plurality of data constraints of the first model.

16. A non-transitory computer-readable storage medium storing computer-readable program code which, when executed by one or more processors, cause the one or more processors to perform operations comprising:
receiving, via a network, a plurality of timestamped data entries from a data source;
obtaining a plurality of data constraints for a first model, wherein the plurality of data constraints comprises a data element used by the first model and an availability requirement set, wherein the availability requirement set defines when the data element is deemed available based on the plurality of timestamped data entries that have the data element;
validating, using the plurality of timestamped data entries as input, the plurality of data constraints to obtain a validation result, wherein validating the plurality of data constraints comprises determining whether the plurality of timestamped data entries satisfies the availability requirement set for the data element;
determining a data availability assessment of the first model based on the validation result; and
storing, in computer storage, the data availability assessment of the first model.

17. The non-transitory computer readable storage medium of claim 16, wherein validating the plurality of data constraints comprises:
identifying at least a portion of the plurality of timestamped data entries having the data element, and
determining whether the at least the portion satisfies the availability requirement set for the data element.

18. The non-transitory computer readable storage medium of claim 16, the operations further comprising:
for each entry of the plurality of timestamped data entries, updating a tally of the data element when the data element matches the entry; and
detecting a data constraint of the plurality of data constraints as unsatisfied when the tally fails to satisfy the availability requirement set.

19. The non-transitory computer readable storage medium of claim 16, the operations further comprising:
identifying a second model as being dependent on the first model; and presenting an alert for the second model based on the plurality of data constraints of the first model being unsatisfied.

20. The non-transitory computer readable storage medium of claim 16, wherein the availability requirement set comprises a temporal requirement.

* * * * *